United States Patent [19]
Kurokawa et al.

[11] Patent Number: 5,966,248
[45] Date of Patent: Oct. 12, 1999

[54] LENS DRIVING MECHANISM HAVING AN ACTUATOR

[75] Inventors: Hiroyuki Kurokawa, Tokyo; Hirotake Nozaki; Akira Yamamoto, both of Kawasaki, all of Japan

[73] Assignee: Nikon Corporation, Tokyo, Japan

[21] Appl. No.: 08/949,688

[22] Filed: Oct. 14, 1997

[30] Foreign Application Priority Data

| Oct. 16, 1996 | [JP] | Japan | 8-273658 |
| Oct. 18, 1996 | [JP] | Japan | 8-276280 |
| Nov. 5, 1996 | [JP] | Japan | 8-292864 |
| Nov. 14, 1996 | [JP] | Japan | 8-302942 |

[51] Int. Cl.$^6$ .................................. G02B 15/14
[52] U.S. Cl. ........................... 359/697; 359/696
[58] Field of Search .................. 359/696, 698, 359/697, 823, 824

[56] References Cited

U.S. PATENT DOCUMENTS 5,150,260  9/1992  Chigira ..................... 359/696

Primary Examiner—Hung Xuan Dang

[57] ABSTRACT

A lens driving mechanism for moving a lens in its optical axis direction has a lens frame for holding the lens, guide means for guiding the lens frame to be movable in the optical axis direction of the lens, and an actuator having an actuation portion that moves in a direction nearly parallel to the optical axis of the lens. In the lens driving mechanism, the lens frame and the actuation portion are directly or indirectly connected so that the lens frame does not move in the optical axis direction relative to the actuation portion of the actuator.

41 Claims, 23 Drawing Sheets

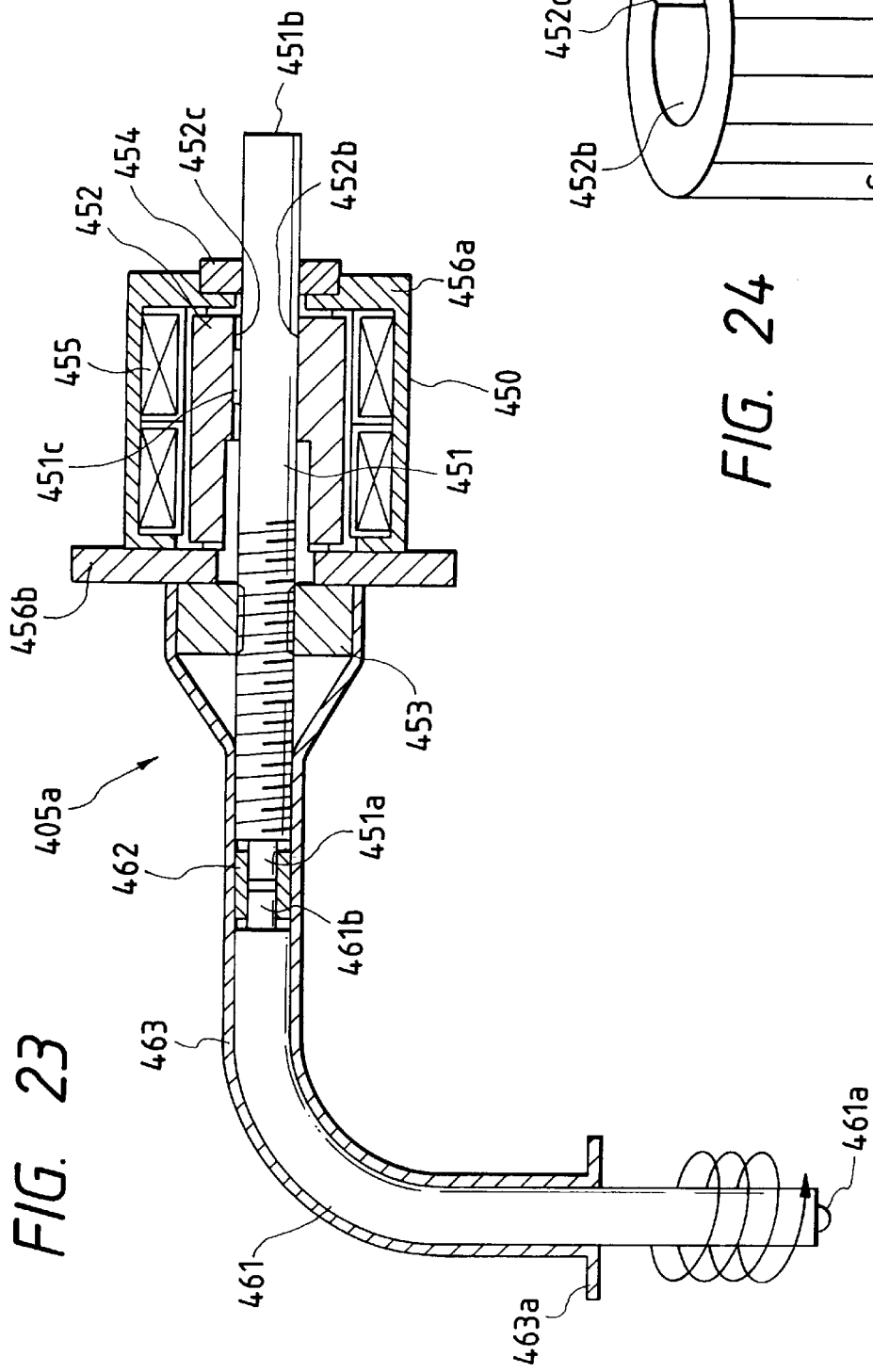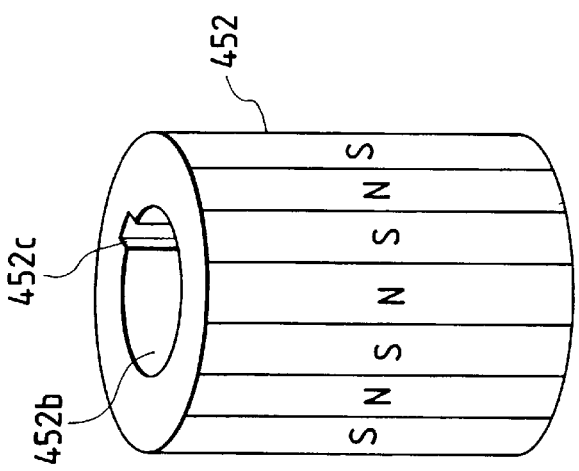
FIG. 23
FIG. 24

LENS DRIVING MECHANISM HAVING AN ACTUATOR

The entire disclosure of Japanese Patent Application Nos. 8-273658, 8-276280, 8-292864, and 8-302942 including specifications, claims, drawings, and summaries is incorporated herein by reference.

BACKGROUND OF THE INVENTION

1. Field of the Invention

The present invention relates to a lens driving mechanism for moving a lens in its optical axis direction.

2. Related Background Art

As a conventional lens driving mechanism, a mechanism shown in, e.g., FIG. 28 is known.

The lens driving mechanism comprises a lens frame 53 for holding a lens 54, a guide shaft 52 for guiding the lens frame 53 to be movable in the optical axis direction of the lens 54, a motor 55 having a rotating output shaft, a feed screw 59 which extends in a direction parallel to an optical axis C and is formed with a male screw on its outer circumferential surface, a nut member 58 formed with a female screw which meshes with the feed screw 59, and a stationary cylinder 51 which covers these members. The nut member 58 is buried in the lens frame 53, and moves integrally with the lens 54 and the lens frame 53. When the feed screw 59 rotates upon driving the motor 55, the nut member 58 moves in the direction parallel to the optical axis C, and the lens frame 53 and the lens 54 move in the optical axis direction upon movement of the nut member 58.

However, in the prior art, the nut member 58, the feed screw 59, and the like are required for moving the lens 54 in the optical axis direction, and the number of parts increases unwontedly. Furthermore, since the lens frame 53 is securely guided by the guide shaft 52 to accurately move in the optical axis direction alone, smooth rotation of the feed screw 59 is disturbed in association with the nut member 58 unless the feed screw 59 is accurately set to be parallel to the optical axis C, resulting in a heavy load on the motor 55. That is, unless the relative positional relationship among the nut member 58, the feed screw 59, and the motor 55 is determined with very high precision, an unwanted constraint force is produced, and a heavy load acts on the motor 55. As described above, since the prior art requires a large number of parts and high assembly precision, a large number of assembly steps is required.

SUMMARY OF THE INVENTION

It is an object of the present invention to provide a lens driving mechanism which can reduce the number of parts, can move a lens in the optical axis direction without requiring high assembly precision, and can consequently reduce the number of assembly steps.

In order to achieve the above object, according to the first aspect of the present invention, there is provided a lens driving mechanism for moving a lens in an optical axis direction thereof, comprising: a lens frame for holding the lens; guide means for guiding the lens frame to be movable in the optical axis direction of the lens; and an actuator having an actuation portion that moves in a direction nearly parallel to an optical axis of the lens, wherein the lens frame and the actuation portion are directly or indirectly connected so that the lens frame does not move in the optical axis direction relative to the actuation portion of the actuator.

Preferably, the actuator comprises: a rotor shaft which extends in the direction nearly parallel to the optical axis, has a male screw formed on a portion of an outer circumferential surface thereof, and serves as the actuation portion; a rotor which is attached to the rotor shaft, the rotor being not rotatable but movable in the optical axis direction relative to the rotor shaft; a stator which is arranged around the rotor and rotates the rotor; an actuator casing for covering the rotor and the stator; and a nut member which is fixed to the actuator casing and is formed with a female screw that meshes with the male screw of the rotor shaft.

The lens driving mechanism preferably further comprises a coupling portion which engages with the lens frame, the coupling portion being not movable in the optical axis direction relative to the lens frame, and is attached to the rotor shaft, the coupling portion being not movable in the optical axis direction relative to the rotor shaft.

The lens frame is preferably formed with a contact surface that contacts an end portion of the rotor shaft, and the lens driving mechanism preferably further comprises biasing means for biasing the lens frame in the optical axis direction and in a direction in which the contact surface of the lens frame and the end portion of the rotor shaft come into contact with each other. The lens frame preferably has a contact plate which forms the contact surface, and a lens frame main body which holds the lens and to which the contact plate is attached, and the contact plate preferably consists of a material having a higher wear resistance than the lens frame main body. Furthermore, the lens frame preferably has an anti-vibration member having elasticity, and the contact plate is preferably attached to the lens frame main body via the anti-vibration member.

The end portion of the rotor shaft, which contacts the contact surface of the lens frame, preferably has a spherical surface.

The lens driving mechanism preferably further comprises a guide shaft which extends in a direction parallel to the optical axis, and is attached to the lens frame, the guide shaft being not movable in the optical axis direction relative to the lens frame; and a coupling portion which engages with the guide shaft, the coupling portion being not movable in the optical axis direction relative to the guide shaft, and is attached to the rotor shaft, the coupling portion being not movable in the optical axis direction relative to the rotor shaft. Alternatively, the lens driving mechanism preferably further comprises a guide shaft which extends in a direction parallel to the optical axis, is formed with a contact surface that contacts an end portion of the rotor shaft, and is attached to the lens frame, the guide shaft being not movable in the optical axis direction relative to the lens frame; and biasing means for biasing the lens frame or the guide shaft in the optical axis direction and in a direction in which the contact surface of the guide shaft and the end portion of the rotor shaft come into contact with each other.

Note that the actuator may comprise a hydraulic cylinder, the output shaft of which projects/retreats, linear electromagnetic motor, the actuation portion of which moves rectilinearly, or the like.

According to the second aspect of the present invention, there is provided a lens driving mechanism for moving a lens in an optical axis direction thereof, comprising: a lens frame for holding the lens; guide means for guiding the lens frame to be movable in the optical axis direction of the lens; and an actuator which has an actuator casing and an actuation portion which moves in a direction nearly parallel to an optical axis of the lens, wherein two end portions of the actuation portion of the actuator in the optical axis direction project from the actuator casing, and the lens frame is formed with a first contact portion that contacts one of the end portions of the actuation portion, and a second contact portion that contacts the other of the end portions of the actuation portion.

Preferably, the actuator comprises: a rotor shaft which extends in the direction nearly parallel to the optical axis, has a male screw formed on a portion of an outer circumferential surface thereof, and serves as the actuation portion; a rotor which is attached to the rotor shaft, the rotor being not rotatable but movable in the optical axis direction relative to the rotor shaft; a stator which is arranged around the rotor and rotates the rotor; and a nut member which is fixed to the actuator casing and is formed with a female screw that meshes with the male screw of the rotor shaft, and the rotor and the stator are covered by the actuator casing.

The two end portions of the actuation portion preferably have a spherical shape.

The lens frame preferably has a first contact plate that forms the first contact portion, a second contact plate that forms the second contact portion, and a lens frame main body which holds the lens and to which the first and second contact plates are attached, and the first and second contact plates preferably consist of a material having a higher wear resistance than the lens frame main body. The lens frame preferably has first and second anti-vibration members having elasticity, and the first and second contact plates are respectively attached to the lens frame main body via the first and second anti-vibration members. Furthermore, an elastic member for generating an elastic force in the optical axis direction is preferably arranged between the first contact portion of the lens frame and the actuator casing, or between the second contact portion of the lens frame and the actuator casing.

According to the third aspect of the present invention, there is provided a lens driving mechanism for moving a lens in an optical axis direction thereof in a lens barrel, comprising: a lens frame for holding the lens; guide means for guiding the lens frame to be movable in the optical axis direction of the lens; and an actuator which has an actuator casing and an actuation portion which moves relative to the actuator casing in a direction nearly parallel to an optical axis of the lens, wherein two end portions of the actuation portion of the actuator in the optical axis direction project from the actuator casing, the actuator casing is fixed to the lens frame; and the lens barrel is formed with first and second contact portions which respectively contact the two end portions of the actuator, the actuation portion being not movable in the optical axis direction relative to the lens barrel.

Preferably, the actuator comprises: a rotor shaft which extends in the direction nearly parallel to the optical axis, has a male screw formed on a portion of an outer circumferential surface thereof, and serves as the actuation portion; a rotor which is attached to the rotor shaft, the rotor being not rotatable but movable in the optical axis direction relative to the rotor shaft; a stator which is arranged around the rotor and rotates the rotor; and a nut member which is fixed to the actuator casing and is formed with a female screw that meshes with the male screw of the rotor shaft, wherein the rotor and the stator are covered by the actuator casing.

The two end portions of the actuation portion preferably have a spherical shape.

The lens barrel preferably has a first contact plate that forms the first contact portion, a second contact plate that forms the second contact portion, and a lens barrel main body to which the first and second contact plates are attached, and the first and second contact plates preferably consist of a material having a higher wear resistance than the lens barrel main body. The lens barrel preferably has first and second anti-vibration members having elasticity, and the first and second contact plates are respectively attached to the lens barrel main body via the first and second anti-vibration members. Furthermore, an elastic member for generating an elastic force in the optical axis direction is preferably arranged between the first contact portion of the lens barrel and the actuator casing, or between the second contact portion of the lens barrel and the actuator casing.

In the first to third aspects of the present invention, since the actuator for driving the lens uses the one having an actuation portion which moves in a direction nearly parallel to the optical axis of the lens, neither the feed screw nor the nut number used for converting rotary motion into rectilinear motion are required, and the number of parts can be reduced. In addition, since these members do not require high assembly precision, the number of assembly steps can be reduced.

Furthermore, the lens frame is accurately guided by the guide means to be movable in a direction parallel to the optical axis, and as long as the driving force acts on the lens frame in a direction including a component in a direction parallel to the optical axis, the lens frame can accurately move in the optical axis direction. For this reason, since the actuation portion of the actuator for moving the lens frame in the optical axis direction need only move in a direction nearly parallel to the optical axis, a decrease in required attachment position precision of the actuator does not lead to production of any unwanted constraint force unlike in the prior art. Hence, the number of assembly steps can be further reduced in addition to a decrease in the number of parts.

According to the fourth aspect of the present invention, there is provided a lens driving mechanism for moving a lens in an optical axis direction thereof, comprising: a lens frame for holding the lens; guide means for guiding the lens frame to be movable in the optical axis direction of the lens; and an actuator for moving the lens in the optical axis direction together with the lens frame, the actuator having: an actuator main body having an actuation portion which reciprocally moves in a predetermined direction; a wire member which has flexibility, and one end portion of which contacts the lens frame or is directly or indirectly coupled to the lens frame, the wire member being not movable in the optical axis direction relative to the lens frame, and the other end portion of which contacts the actuation portion of the actuator main body or is directly or indirectly coupled to the actuation portion, the wire member being not movable in the predetermined direction relative to the actuation portion; and a guide member for movably guiding the wire member.

Preferably, the actuator main body comprises: a rotor shaft which extends in the predetermined direction, has a male screw formed on a portion of an outer circumferential surface thereof, and serves as the actuation portion; a rotor which is attached to the rotor shaft, the rotor being not rotatable about the rotor shaft but movable in an extending direction of the rotor shaft relative to the rotor shaft; a stator which is arranged around the rotor and rotates the rotor; an actuator casing that covers the rotor and the stator; and a nut member which is fixed to the actuator casing and is formed with a female screw that meshes with the male screw of the rotor shaft.

The lens driving mechanism preferably further comprises biasing means for biasing the lens frame to always contact the one end portion of the wire member.

The guide member is preferably a pipe-shaped member which has flexibility and is formed with an insertion hole that can receive the wire member.

In the fourth aspect of the present invention, neither the feed screw nor the nut number used for converting rotary motion into rectilinear motion are required, and the number of parts can be reduced. In addition, since these members do not require high assembly precision, the number of assembly steps can be reduced.

Furthermore, the lens frame is accurately guided by the guide means to be movable in a direction parallel to the optical axis, and as long as the driving force acts on the lens frame in a direction including a component in a direction parallel to the optical axis, the lens frame can accurately move in the optical axis direction. For this reason, one end portion of the wire member for moving the lens frame in the optical axis direction need only move in a direction nearly parallel to the optical axis. Relative movement between one end portion of the wire member and the lens frame need only be inhibited in only the direction parallel to the optical axis. Furthermore, since the wire member for transmitting the operation of the actuation portion of the actuator main body has flexibility, even when the required attachment position precision of the actuator having the wire member and the actuator main body lowers, production of any unwanted constraint force can be prevented unlike in the prior art. For this reason, the present invention can further reduce the number of assembly steps in addition to a decrease in the number of parts.

According to the present invention, since the position of the actuator main body has no limitation upon driving the lens frame, the degree of freedom in design can be increased. For this reason, a large distance between the lens frame and the motor main body can be easily assured, and heat, vibrations and the like transmitted from the motor main body to the lens frame can be attenuated.

According to the fifth aspect of the present invention, there is provided an actuator, an actuation end of which projects/retreats, comprising: a rotor shaft which extends in a predetermined direction and has a male screw formed on a portion of an outer circumferential surface thereof; a rotor which is attached to the rotor shaft, the rotor being not rotatable about the rotor shaft but movable in an extending direction of the rotor shaft relative to the rotor shaft; a stator which is arranged around the rotor and rotates the rotor; an actuator casing that covers the rotor and the stator; a nut member which is fixed to the actuator casing and is formed with a female screw that meshes with the male screw of the rotor shaft; a wire member which has flexibility, and one end portion of which is coupled to an end portion of the rotor, the wire member being not movable in the predetermined direction and not rotatable relative to the rotor shaft, and the other end portion of which serves as the actuation end; and a guide member for movably guiding the wire member.

The above and other objects, features and advantages of the present invention will be explained hereinafter and may be better understood by reference to the drawings and the descriptive matter which follows.

BRIEF DESCRIPTION OF THE DRAWINGS

FIG. 23 is a sectional view of a motor used in the 14th embodiment;

FIG. 24 is a perspective view of a rotor of the motor shown in FIG. 23;

DETAILED DESCRIPTION OF THE PREFERRED EMBODIMENTS

A lens driving mechanism according to the first embodiment of the present invention will be described below with reference to FIGS. 1 to 5.

Figure 1:
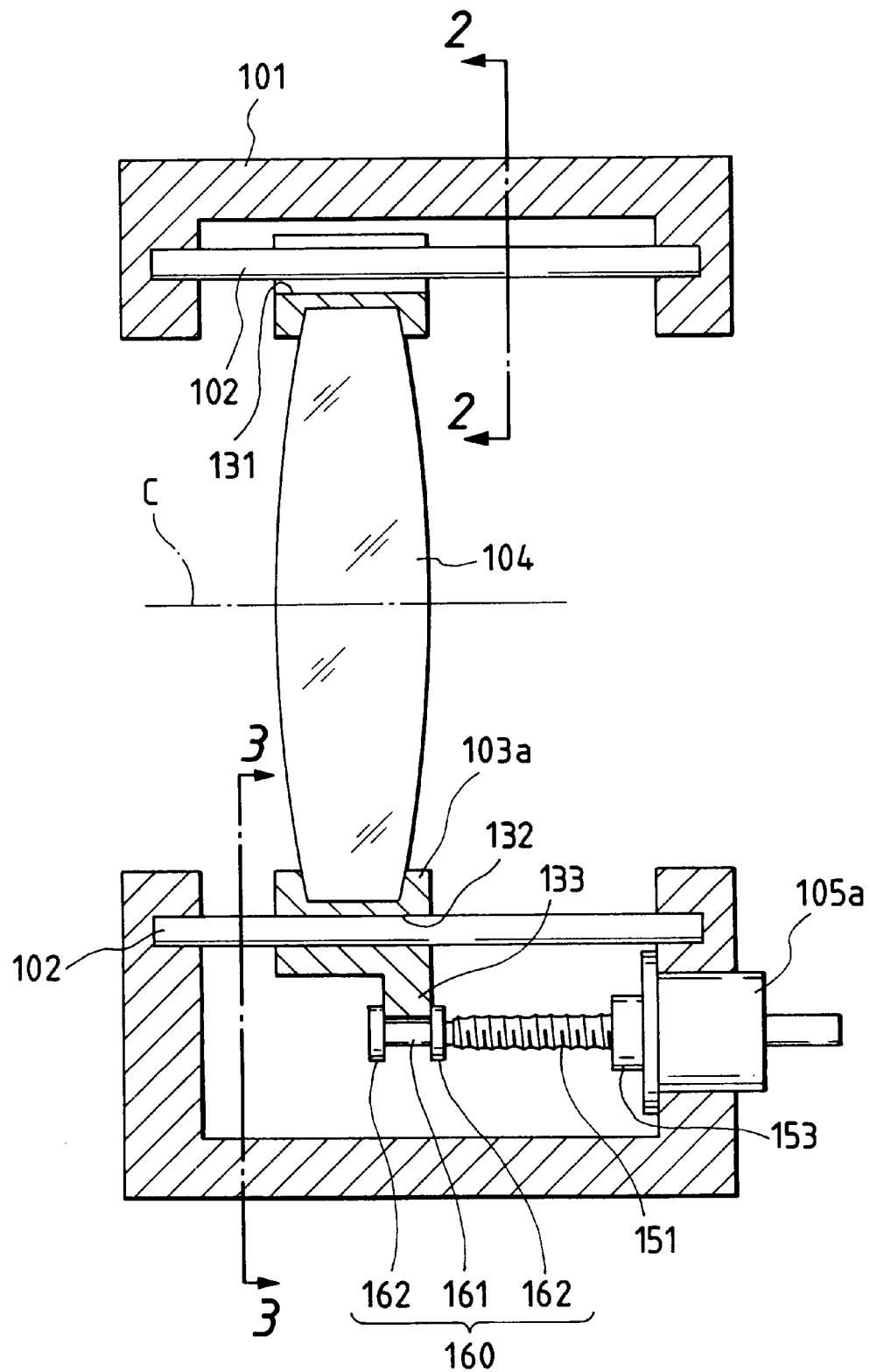
FIG. 1 is a sectional view of a lens driving mechanism according to the first embodiment of the present invention.

As shown in FIG. 1, the lens driving mechanism comprises a lens frame 103a for holding a lens 104, a plurality of guide shafts 102 for guiding the lens frame 103*a* to be movable in the optical axis direction of the lens 104, a stepping motor 105*a* for moving the lens frame 103*a* in the optical axis direction, a coupling member 160 for coupling a rotor shaft 151 as the output shaft of the stepping motor 105*a* and the lens frame 103*a*, and a stationary cylinder 101 that covers these members.

Figure 2:
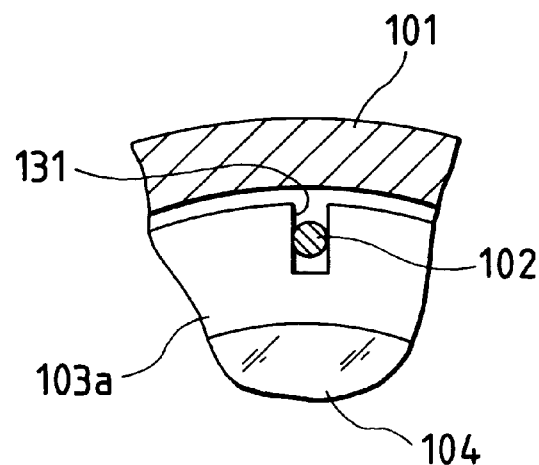
FIG. 2 is a sectional view taken along a line 2—2 in FIG. 1.

The plurality of guide shafts 102 extend in a direction parallel to an optical axis C, and are fixed to the stationary cylinder 101 at their two-end portions. The lens frame 103*a* is formed with a guide groove 131, which recesses radially inwardly, and receives the guide shaft 102, as shown in FIGS. 1 and 2, a guide shaft insertion hole 132 for receiving the guide shaft 102, and a driving force acting portion 133 which protrudes radially outwardly, and receives the driving force from the motor 105*a*, as shown in FIGS. 1 and 3.

Figure 4:
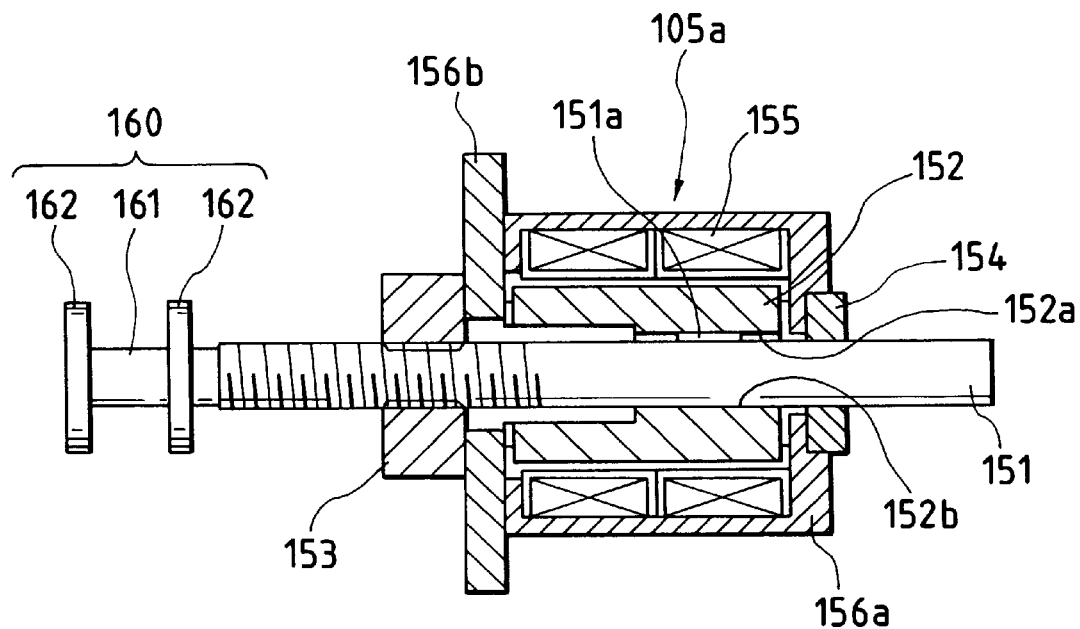
FIG. 4 is a sectional view of a stepping motor used in the first embodiment.
Figure 5:
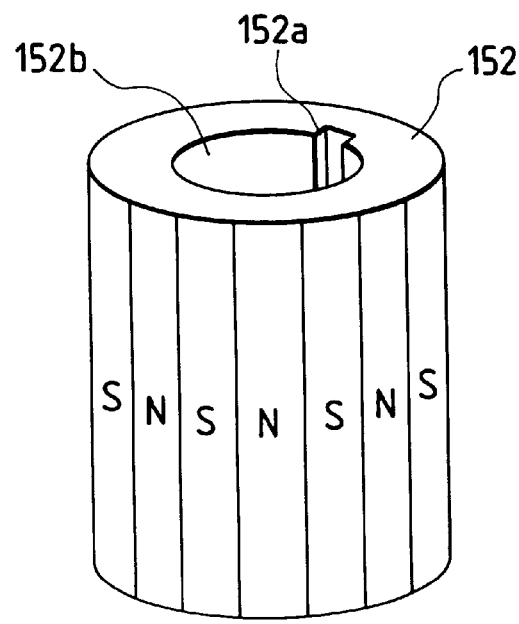
FIG. 5 is a perspective view of a rotor of the stepping motor shown in FIG. 4.

As shown in FIG. 4, the stepping motor 105*a* has the rotor shaft 151 (actuation portion) which is formed with a male screw on its outer circumferential portion on one end portion side, a rotor 152 attached to the rotor shaft 151, a stator 155 arranged around the rotor 152, a hollow, cylindrical casing 156*a* that covers the rotor 152 and the stator 155, a flange 156*b* that closes an opening at one end portion of the hollow, cylindrical casing 156*a*, a bearing 154 for supporting the rotor shaft 151, and a nut member 153 formed with a female screw that threadably engages with the male screw of the rotor shaft 151. The coupling member 160 is fixed to one end portion of the rotor shaft 151. A key 151*a* is formed on the middle portion of the rotor shaft 151. The key 151*a* projects radially outwardly and extends in the extending direction of the rotor shaft 151. As shown in FIG. 5, the rotor 152 has a cylindrical shape, and N and S poles are alternately and regularly excited around the axis of the rotor 152. That is, this stepping motor 105*a* is of permanent magnet type (PM type). The rotor 152 has a through hole 152*b* that receives the rotor shaft 151. A key groove 152*a* is formed on the inner circumferential surface of the through hole 152*b*. The key groove 152*a* extends in the extending direction of the through hole 152*b*, and can receive the key 151*a* of the rotor shaft 151. With this structure, the rotor shaft 151 is attached to the rotor 152, so that the rotor shaft 151 does not rotate but moves in the extending direction of the rotor shaft 151 relative to the rotor 152 when the rotor shaft 151 is inserted into the through hole 152*b* of the rotor 152 and the key 151*a* of the rotor shaft 151 is fitted into the key groove 152*a* of the rotor 152. The stator 155 is fixed to the inner circumferential surface of the hollow, cylindrical casing 156*a* to face the outer circumferential surface of the rotor 152. The stator 155 is a two-phase coil, which is excited so that the rotor 152 rotates about the rotor shaft. The nut member 153 is fixed to the flange 156*b* fixed to one end portion of the casing 156*a*. The bearing 154 is fixed to the other end portion of the casing 156*a*. The bearing 154 supports the rotor shaft 151 to be rotatable and to be movable in the extending direction of the rotor shaft 151. The motor 105*a* is fixed to the stationary cylinder 101, so that the rotor shaft 151 extends in a direction nearly parallel to the optical axis C.

Figure 3:
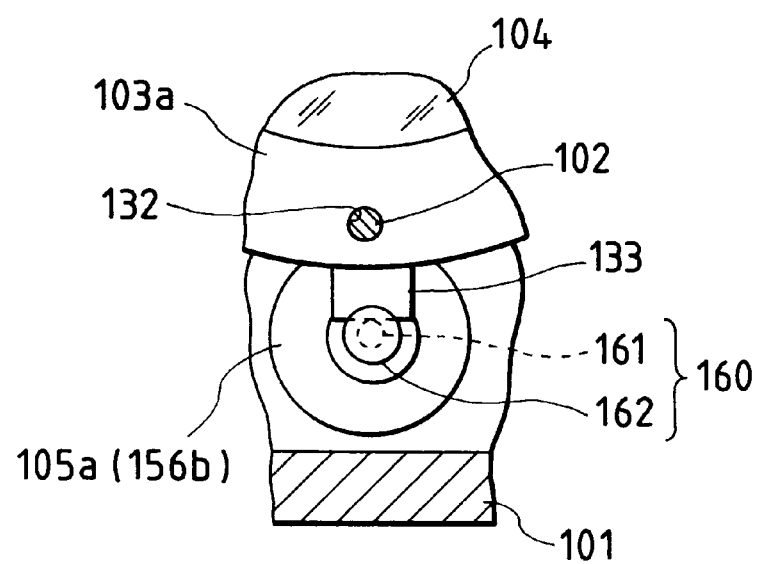
FIG. 3 is a sectional view taken along a line 3—3 in FIG. 1.

As shown in FIGS. 1 and 3, the coupling member 160 has a cylindrical middle body portion 161, and disc-shaped flanges 162 formed on the two end portions of the middle body portion 161. The interval between the two flanges 162 is nearly equal to the thickness of the driving force acting portion 133 of the lens frame 103*a* in the direction parallel to the optical axis C, and the driving force acting portion 133 of the lens frame 103*a* is fitted between the two flanges 162. Hence, relative to the lens frame 103*a* the coupling member 160 does not move in the direction parallel to the optical axis C but moves in the direction perpendicular to the optical axis C. One flange 162 of the coupling member 160 is joined to one end portion of the rotor shaft 151.

The operation of the lens driving mechanism in this embodiment will be explained below.

When currents are supplied to the stator 155 of the motor 105*a*, an electromagnetic force for rotating the rotor 152 about the rotor shaft is generated, and the rotor 152 rotates. Since the rotor 152 is attached to the rotor shaft 151 so that it does not rotate relative to the rotor shaft 151, the rotor shaft 151 rotates upon rotation of the rotor 152. The rotor shaft 151 moves in the extending direction of the rotor shaft 151, i.e., in the direction parallel to the optical axis C, upon rotation of the rotor 152, since it threadably engages with the nut member 153 fixed to the flange 156*b*.

The coupling member 160 moves in the direction parallel to the optical axis C while rotating integrally with the rotor shaft 151, since it is fixed to the end portion of the rotor shaft 151. Also, since the coupling member 160 engages with the lens frame 103*a* by its two flanges 162 so that the member 160 rotates but does not move in the direction parallel to the optical axis relative to the lens frame 103*a*, the lens frame 103*a* and the lens 104 held by the lens frame 103*a* move in the optical axis direction while being guided along the guide shafts 102.

Figure 28:
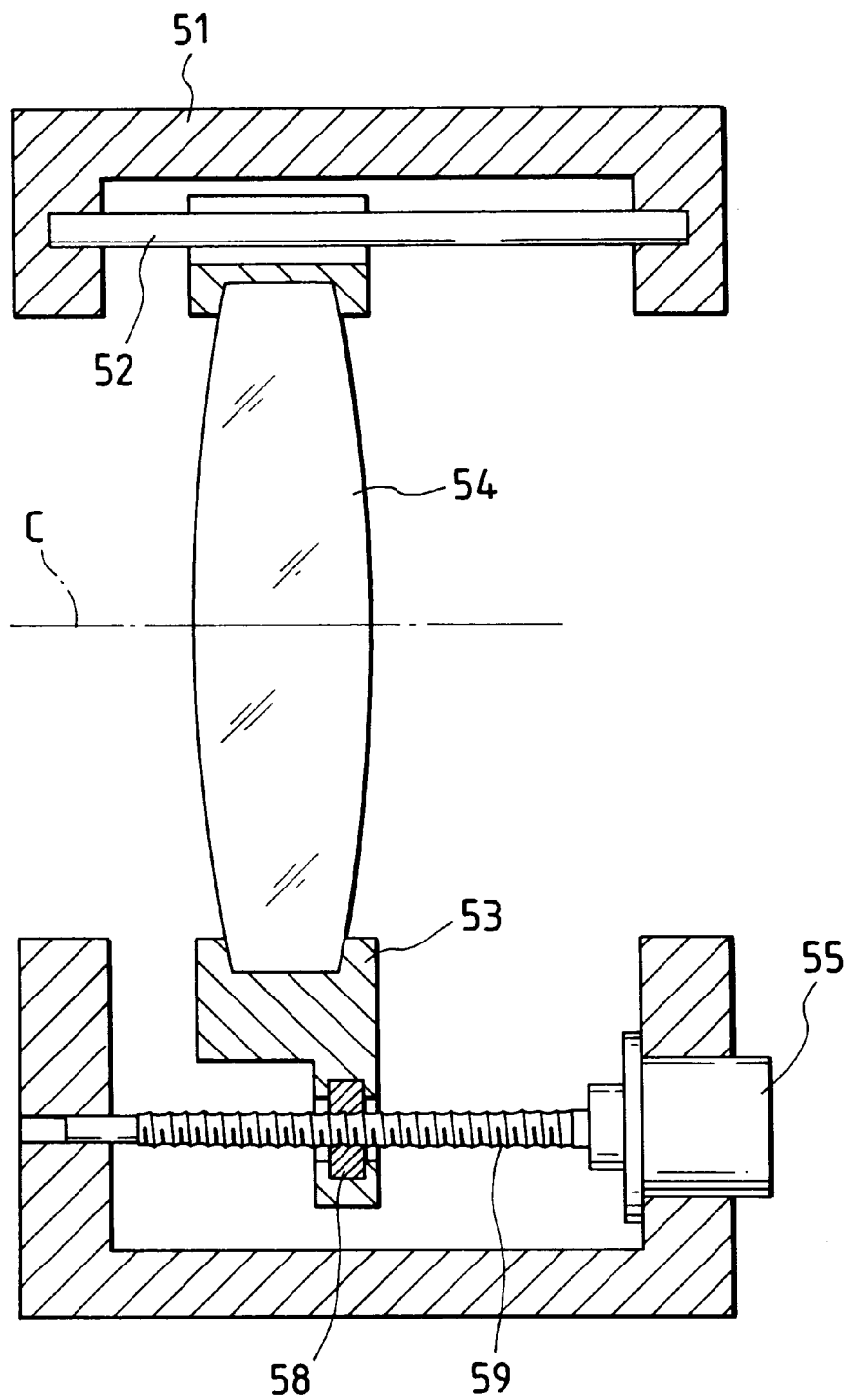
FIG. 28 is a sectional view of a conventional lens driving mechanism.

As described above, according to this embodiment, since members corresponding to the feed screw 59 and the nut member 58 in the prior art shown in FIG. 28 are incorporated in the motor 105*a*, such feed screw 59 and nut member 58 need not be prepared additionally, and the number of parts can be reduced. In addition, since these members do not require high assembly precision, the number of assembly steps can be reduced.

Since the lens frame 103*a* is accurately guided by the guide shafts 102 to be movable in the direction parallel to the optical axis C, the lens frame 103*a* can accurately move in the optical axis direction as long as the driving force acts on the lens frame 103*a* in a direction including a component in a direction parallel to the optical axis C. For this reason, in this embodiment, the rotor shaft 151 for moving the lens frame 103*a* in the optical axis direction need only extend in a direction nearly parallel to the optical axis C, and its position in the direction perpendicular to the optical axis C can be freely determined within a range in which the coupling member 160 fixed to the end portion of the rotor shaft 151 engages with the driving force acting portion 133 of the lens frame 103*a*. Hence, the motor 105*a* need not be fixed to the stationary cylinder 101 at very high positioning precision. Since the coupling member 160 fixed to the end portion of the rotor shaft 151 does not move in the direction parallel to the optical axis C but moves in the direction perpendicular to the optical axis C relative to the lens frame 103*a*, production of any unwanted constraint force can be prevented unlike in the prior art without fixing the motor 105*a* to the stationary cylinder 101 with high positioning precision. Hence, the number of assembly steps can be further reduced in addition to a decrease in the number of parts.

A lens driving mechanism according to the second embodiment of the present invention will be described below with reference to FIG. 6.

This embodiment is substantially the same as the first embodiment shown in FIG. 1, except that a mechanism for attaching the rotor shaft 151 of the stepping motor 105*a* to a lens frame 103*b* to be fixed in position in the direction parallel to the optical axis C relative to the lens frame 103*b* is changed.

As in the first embodiment, the lens frame 103b has a driving force acting portion 133b that protrudes radially outwardly. The driving force acting portion 133b has a rotor shaft contact surface 134, which is formed on the camera main body side (motor 105a side) of the portion 133b and is perpendicular to the optical axis C, and a spring contact surface 135 which is formed on the object side (the side opposite to the camera main body side) of the portion 133b, and is perpendicular to the optical axis C. One end portion of the rotor shaft 151 contacts the rotor shaft contact surface 134 of the driving force acting portion 133b. A coil spring (biasing means) 165 for biasing the lens frame 103b toward the camera main body side is arranged between the spring contact surface 135 of the driving force acting portion 133b, and the inner surface of the stationary cylinder 101 on the object side.

With this arrangement, since the coil spring 165 is used, the rotor shaft 151 does not move in the direction parallel to the optical axis C relative to the lens frame 103b without using the coupling member 160 unlike in the first embodiment. In this embodiment, the coil spring 165 is used for biasing the lens frame 103b toward the camera main body side, i.e., toward the rotor shaft 151 side. However, the present invention is not limited to such specific means, and other elastic members may be used.

Figure 7:
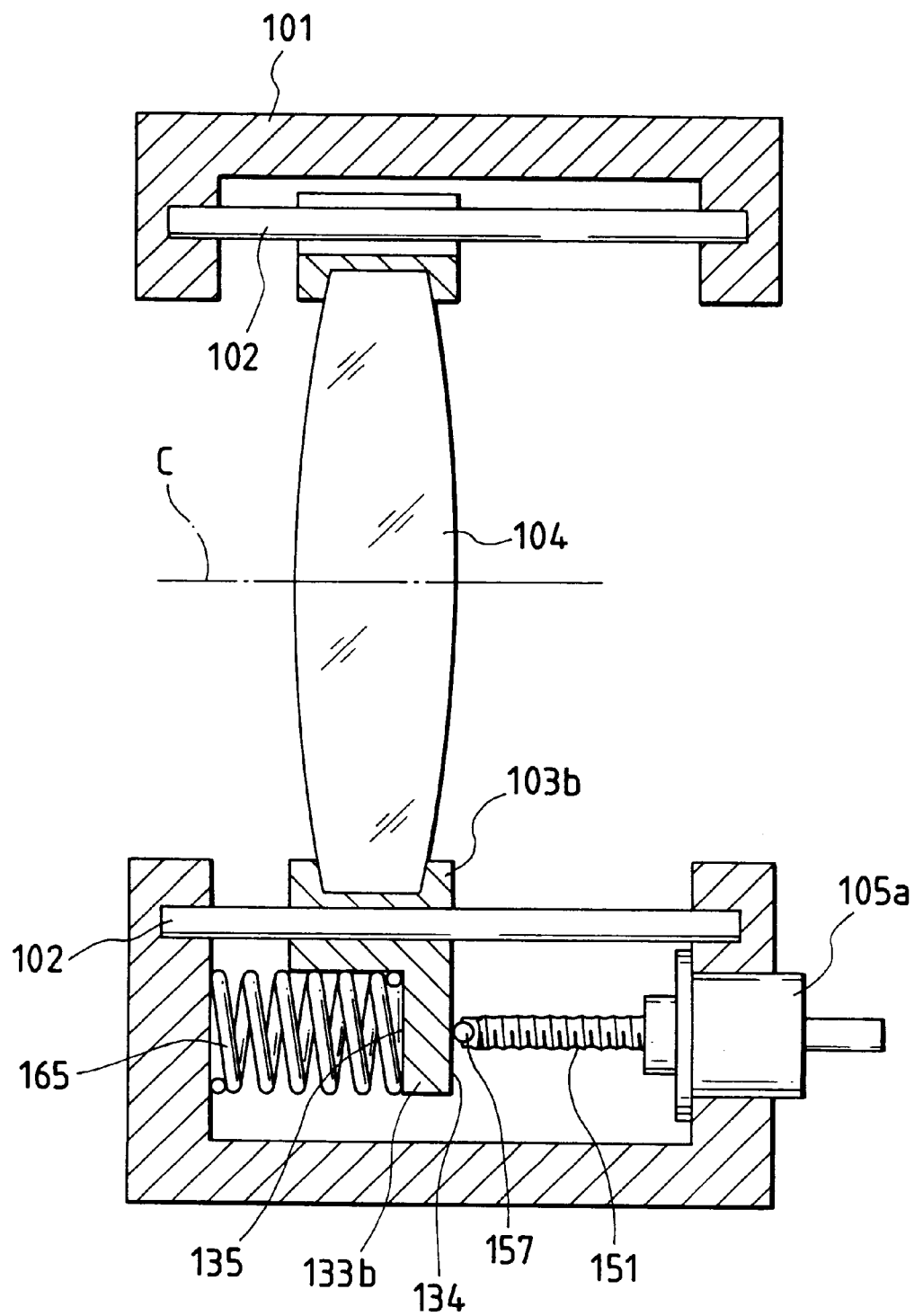
FIG. 7 is a sectional view of a lens driving mechanism according to the third embodiment of the present invention.

A lens driving mechanism according to the third embodiment of the present invention will be described below with reference to FIG. 7.

Figure 6:
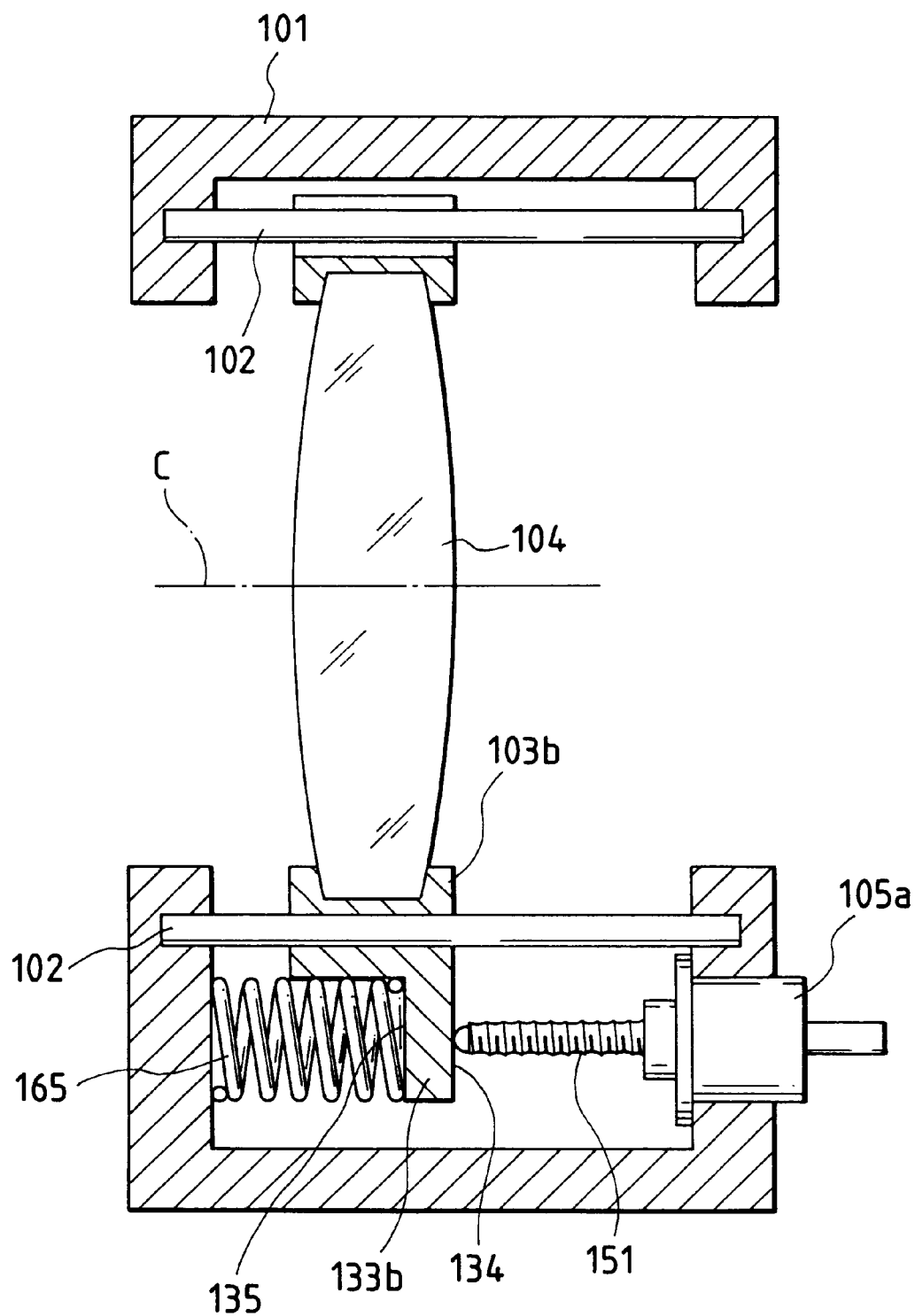
FIG. 6 is a sectional view of a lens driving mechanism according to the second embodiment of the present invention.

This embodiment is substantially the same as the second embodiment shown in FIG. 6, except that a ball 157 is rotatably attached to one end portion of the rotor shaft 151.

A ball storage recess portion is formed on one end portion of the rotor shaft 151, and a ball 157 is rotatably stored there. That is, the ball 157 is attached to one end portion of the rotor shaft 151 like the pen tip of a ball-point pen.

With this arrangement, since one end portion of the rotor shaft 151 (this rotor shaft 151 is a concept including the ball 157) is formed into a spherical surface, the rotor shaft 151 is in point-contact with the rotor shaft contact surface 134 of the lens frame 103b, and the need for setting the rotor shaft 151 to be parallel to the optical axis C can be further obviated. Hence, the required attachment precision of the motor 105a with respect to the stationary cylinder 101 can be further lowered. Even when the rotor shaft 151 vibrates and rotates, and the contact position of the rotor shaft end portion changes on the rotor shaft contact surface 134 of the lens frame 103b, since the rotor shaft end portion is in rolling-contact with the rotor shaft contact surface 134 of the lens frame 103b, the load on the motor 105a can be prevented from increasing, and the rotor contact surface 134 can also be prevented from wearing.

A lens driving mechanism according to the fourth embodiment of the present invention will be described below with reference to FIG. 8.

This embodiment is substantially the same as the second embodiment shown in FIG. 6, except that a lens frame 103c has a contact plate 136 that forms a rotor shaft contact surface 134a, and a lens frame main body 137 which holds the lens 104, and to which the contact plate 136 is attached.

In this embodiment, the lens frame main body 137 consists of a resin or aluminum to attain a weight reduction and the like. The contact plate 136 consists of stainless steel as a material having a smaller deformation amount and higher wear resistance than the lens frame main body 137. Since the lens frame 103c is formed, as described above, the wear resistance of the lens frame 103c can be improved, and a weight reduction can be attained.

Figure 9:
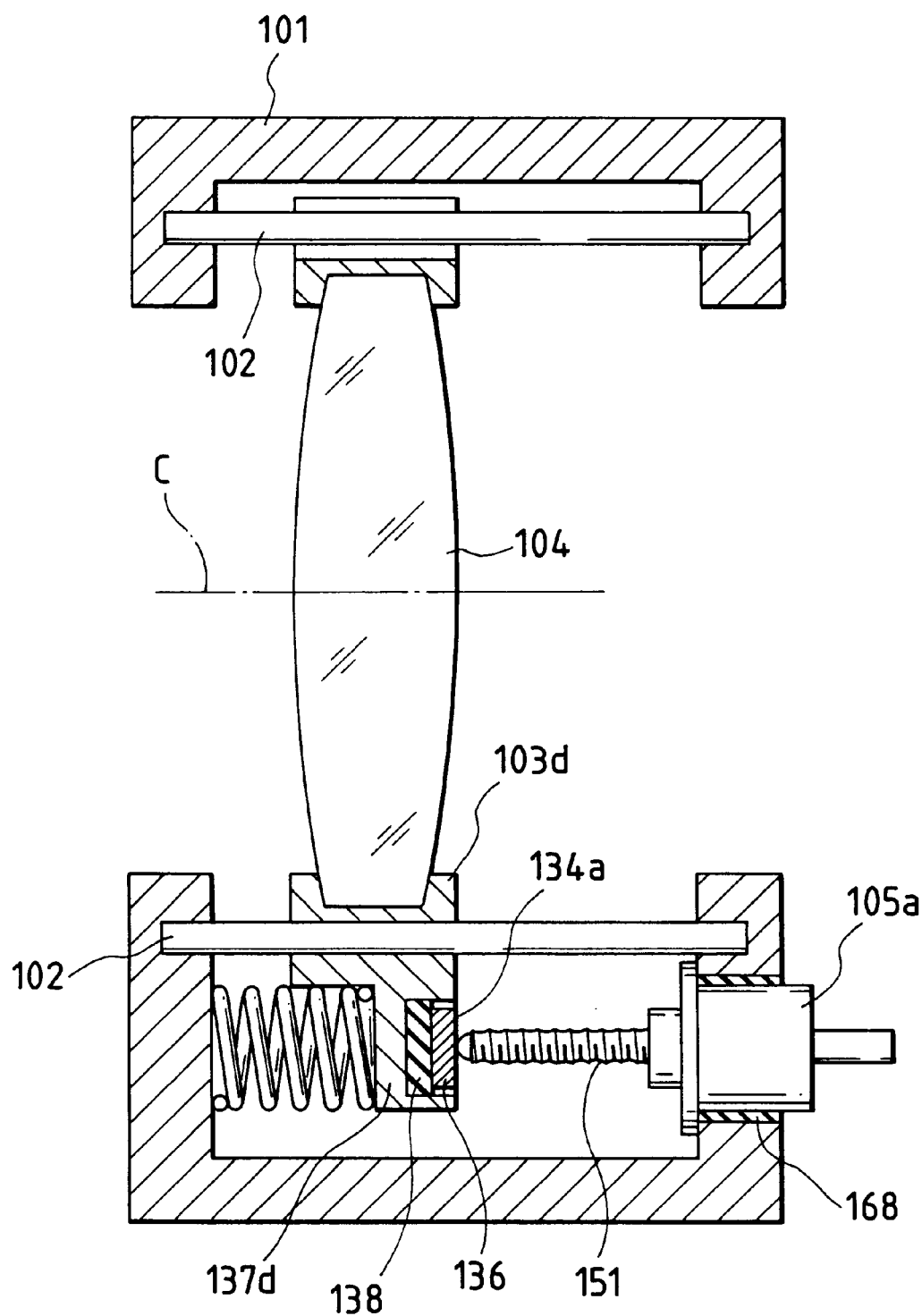
FIG. 9 is a sectional view of a lens driving mechanism according to the fifth embodiment of the present invention.

A lens driving mechanism according to the fifth embodiment of the present invention will be described below with reference to FIG. 9.

Figure 8:
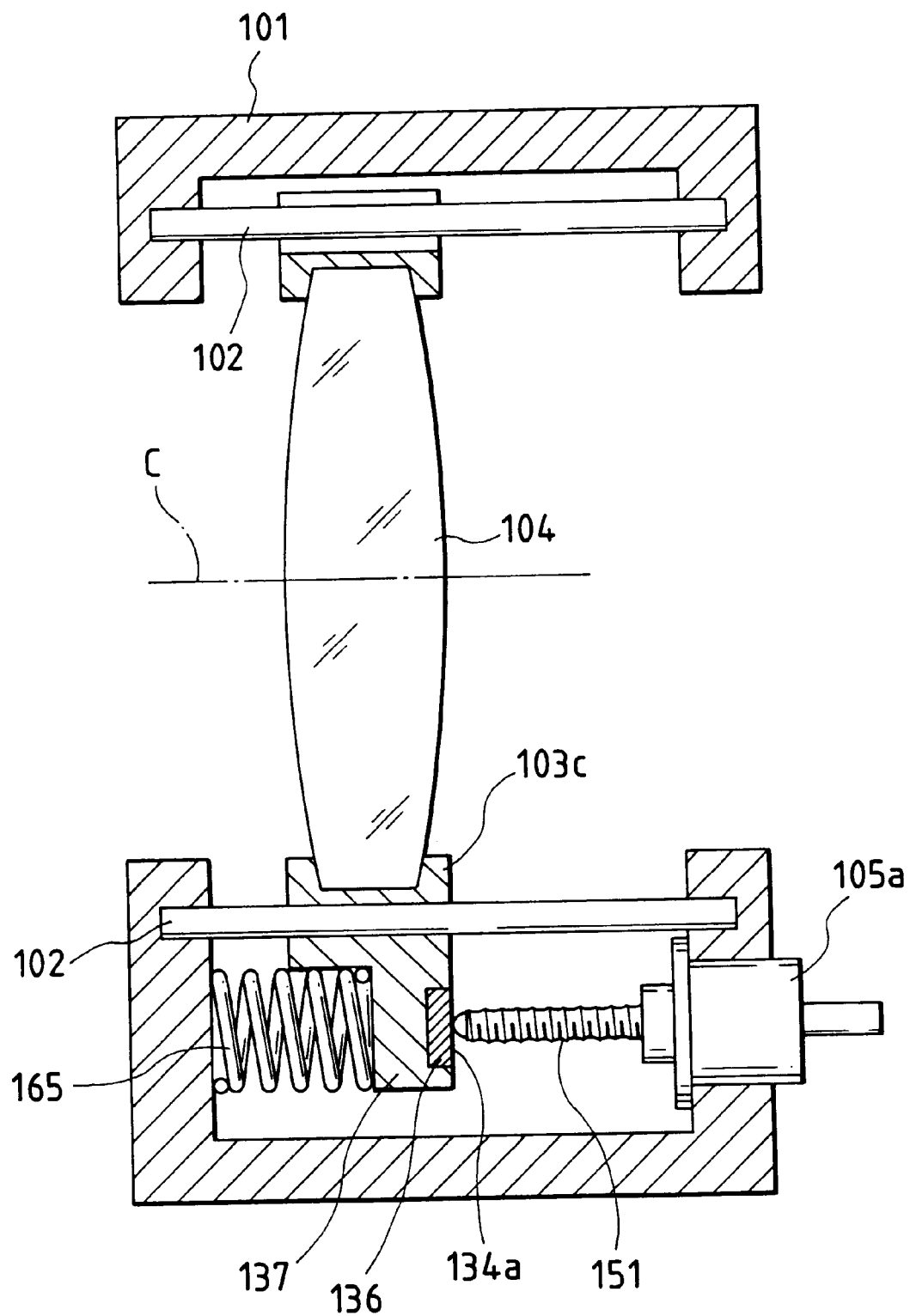
FIG. 8 is a sectional view of a lens driving mechanism according to the fourth embodiment of the present invention.

This embodiment is substantially the same as the fourth embodiment shown in FIG. 8, except that rubber members 138 and 168 are respectively arranged on the mount portion of the contact plate 136 and the mount portion of the motor 105a in the fourth embodiment.

A lens frame 103d in this embodiment has a lens frame main body 137d, the contact plate 136, and the rubber member 138. The contact plate 136 is fixed to the lens frame main body 137d via the rubber member 138. Also, the stepping motor 105a is fixed to the stationary cylinder 101 via the rubber member 168.

The stepping motor 105a normally produces vibrations during its operation since it operates intermittently. For this reason, in this embodiment, in order to prevent vibrations of the stepping motor 105a from being transmitted to other members as much as possible, the rubber members 138 and 168 as anti-vibration members are arranged on the mount portions of the contact plate 136 and the motor 105a. In this embodiment, since parallelism between the rotor haft 151 and the optical axis C and the position of he motor 105a in the direction perpendicular to the optical axis C do not require high precision, the motor 105a as a vibration source can be supported by the rubber member 168 that deforms elastically.

A lens driving mechanism according to the sixth embodiment of the present invention will be described below with reference to FIG. 10.

In this embodiment, a guide shaft 121 (to be referred to as an "interlock guide shaft" hereinafter) as one of a plurality of guide shafts 102 and 121 is attached to a lens frame 103e to be relatively immovable in the direction parallel to the optical axis C and is attached to a stationary cylinder 101e to be relatively movable, and the lens frame 103e is moved by the motor 105a in the optical axis direction together with the interlock guide shaft 121.

A coupling member 160e is fixed to one end portion of the rotor shaft 151.

The interlock guide shaft 121 is arranged to be parallel to the optical axis C and to be located on the same line as the rotor shaft 151, and extends through the lens frame 103e. In order to attach the lens frame 103e to the interlock guide shaft 121 so that the lens frame 103e does not move in the direction parallel to the optical axis C relative to the shaft 121, the interlock guide shaft 121 has flanges 122 which respectively contact the two surfaces of the lens frame 103e on the camera main body side and the object side, and sandwiches the lens frame 103e between the two flanges 122. An engaging recess portion 123 is formed on the end portion of the interlock guide shaft 121 on the camera main body side, and receives the coupling member 160e, so that the coupling member 160e rotates but does not move in the direction parallel to the optical axis C relative to the shaft 121.

In this embodiment, since the interlock guide shaft 121 and the rotor shaft 151 are arranged on a single line, the diameter of the stationary cylinder 101e can be reduced although its length increases in the optical axis direction. Since the acting position of the driving force approaches the lens 104 in the direction perpendicular to the optical axis C, the moment acting on the lens frame 103e and the lens 104 can be reduced, and the lens frame 103e and the lens 104 can move more smoothly. Furthermore, since the length of the interlock guide shaft 121 can be relatively freely changed, the degree of freedom in layout of the motor 105a can be improved.

Figure 11:
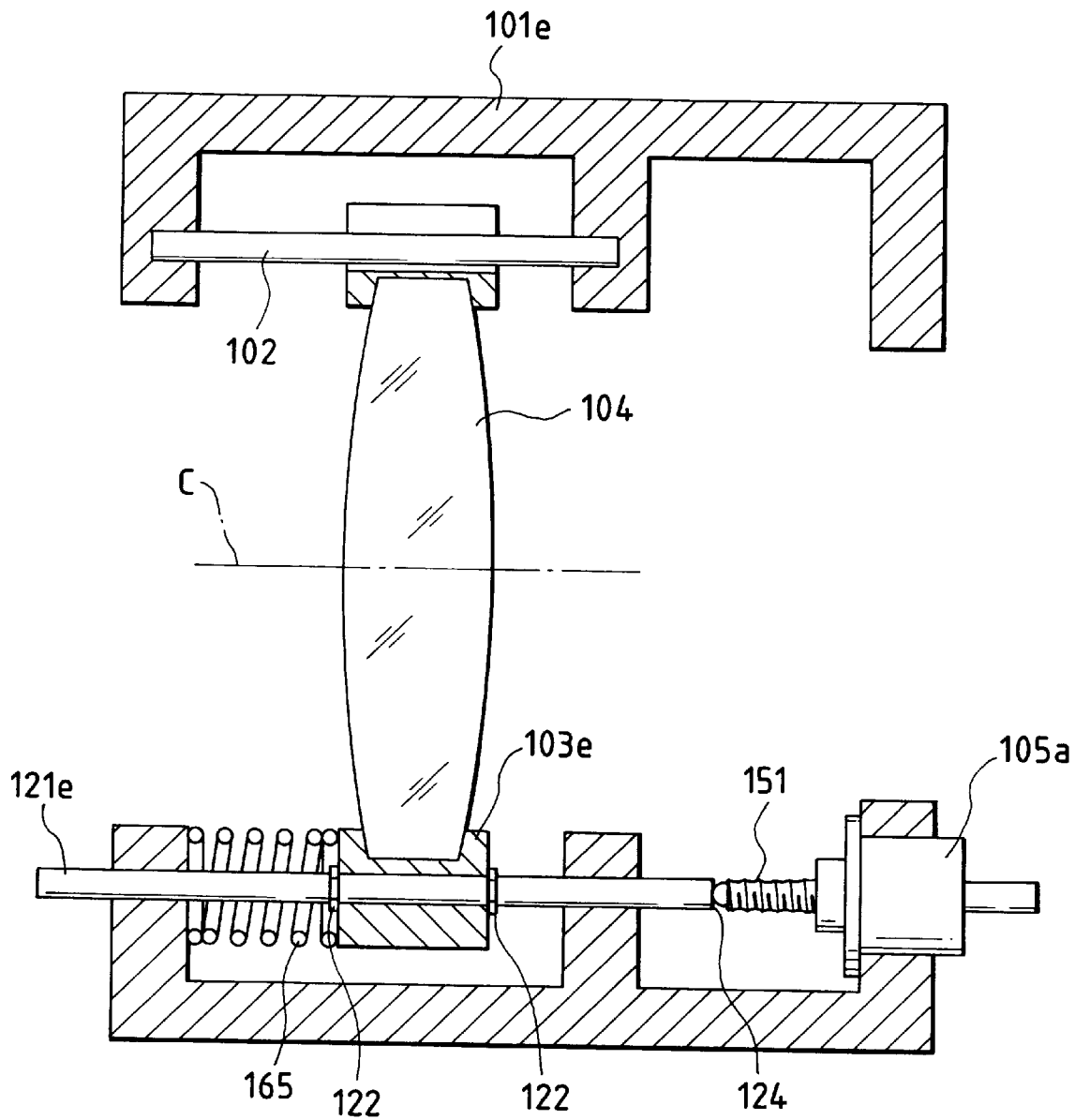
FIG. 11 is a sectional view of a lens driving mechanism according to the seventh embodiment of the present invention.

A lens driving mechanism according to the seventh embodiment of the present invention will be described below with reference to FIG. 11.

Figure 10:
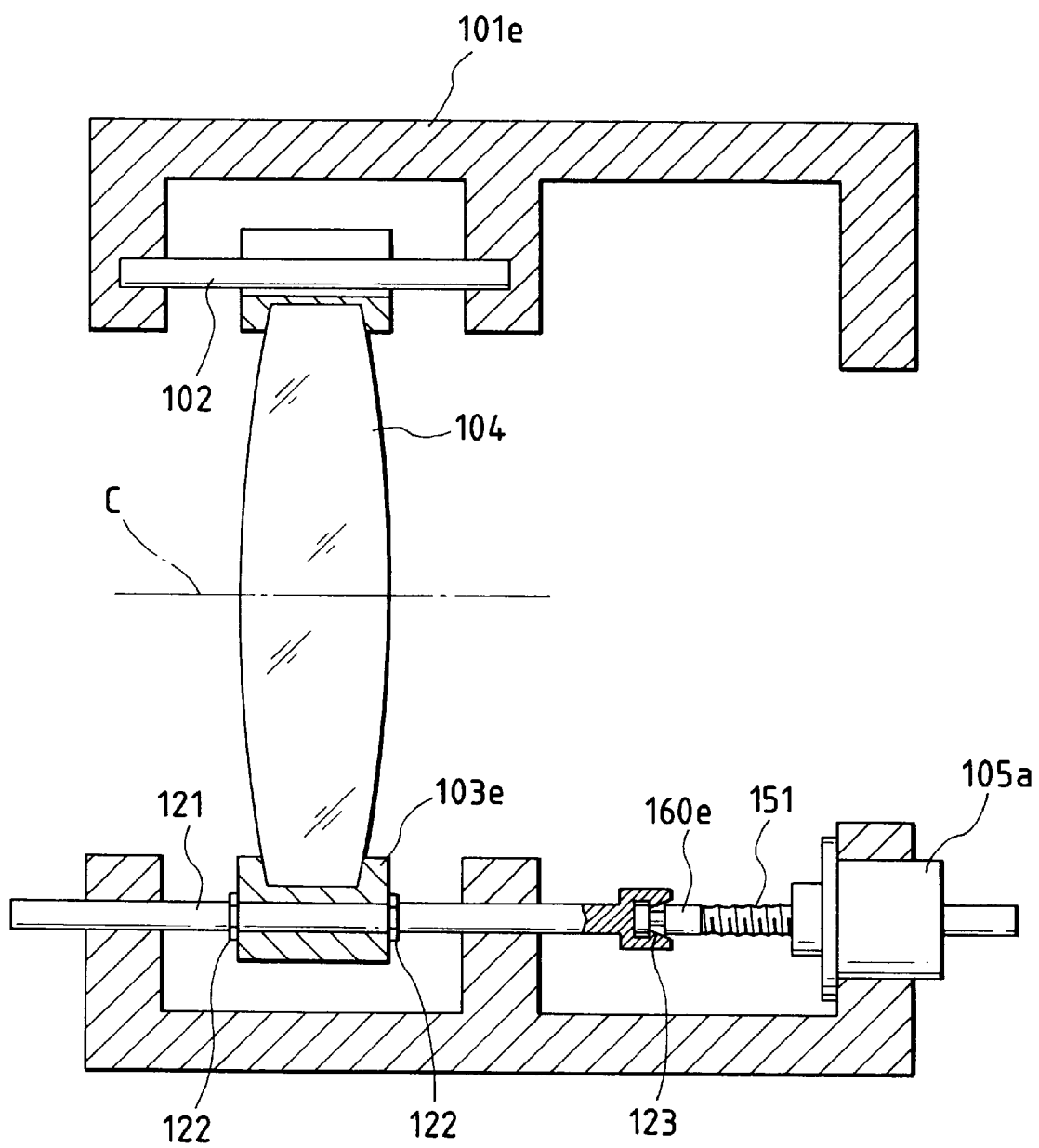
FIG. 10 is a sectional view of a lens driving mechanism according to the sixth embodiment of the present invention.

This embodiment is substantially the same as the sixth embodiment shown in FIG. 10, except that the mechanism for attaching the rotor shaft 151 of the stepping motor 105a to the lens frame 103e to be relatively immovable in the direction parallel to the optical axis C is changed.

A rotor shaft contact surface 124 that contacts one end portion of the rotor shaft 151 is formed on the camera main body side of the interlock guide shaft 121e. A coil spring 165 for biasing the lens frame 103e toward the camera main body side is arranged between the surface of the lens frame 103e on the object side and the inner surface of the stationary cylinder 101e on the object side.

With this arrangement, since the coil spring 165 is used, relative movement between the lens frame 103e and the rotor shaft 151 in the direction parallel to the optical axis C can be inhibited without using the coupling member 160 unlike in the embodiment shown in FIG. 10. In this embodiment as well, other elastic members may be used in place of the coil spring 165 as in the second embodiment shown in FIG. 6.

A lens driving mechanism according to the eighth embodiment of the present invention will be described below with reference to FIGS. 12 to 14.

Figure 12:
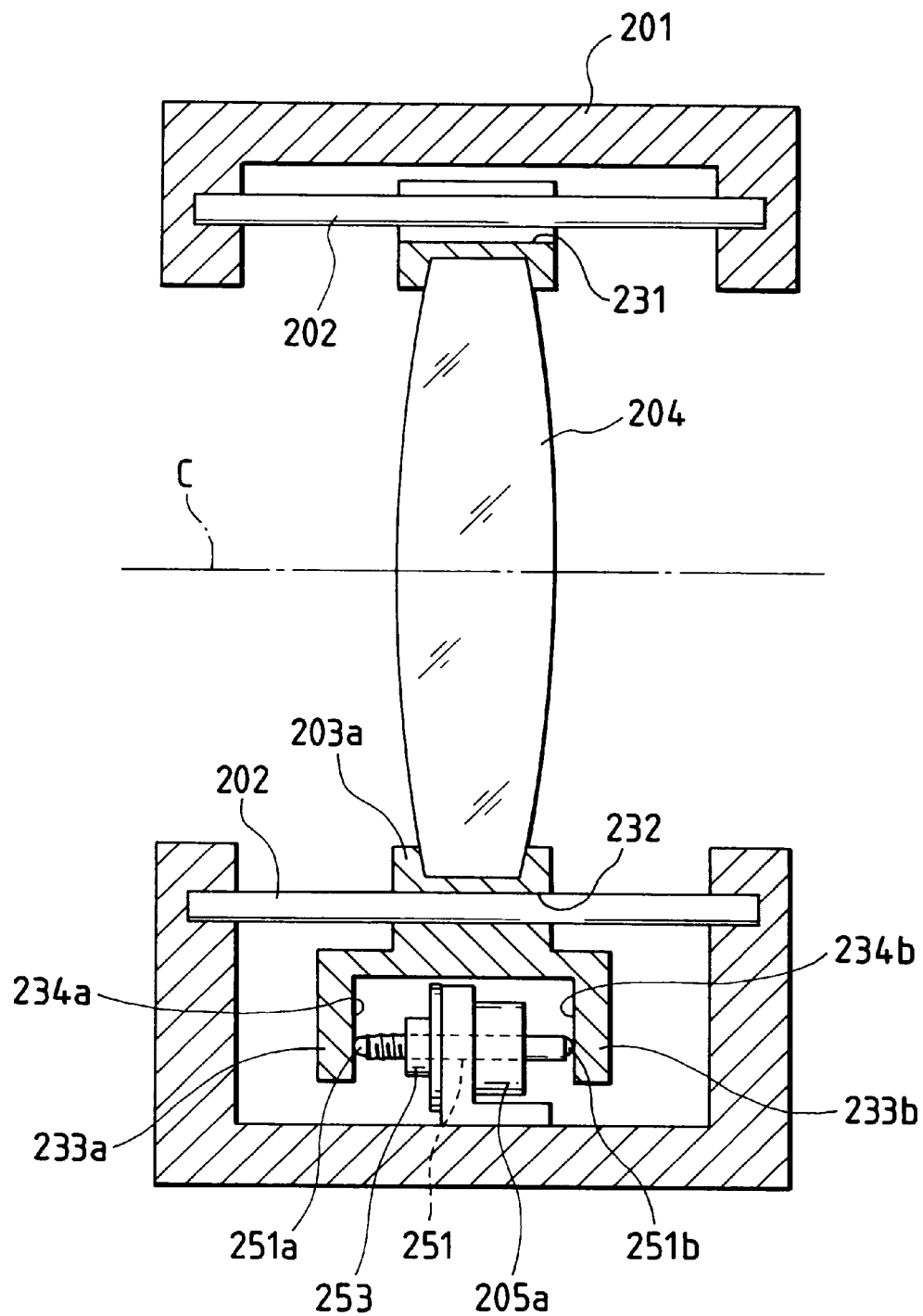
FIG. 12 is a sectional view of a lens driving mechanism according to the eighth embodiment of the present invention.

As shown in FIG. 12, the lens driving mechanism comprises a lens frame 203a for holding a lens 204, a plurality of guide shafts 202 for guiding the lens frame 203a to be movable in the optical axis direction of the lens 204, a stepping motor 205a for moving the lens frame 203a in the optical axis direction, and a stationary cylinder 201 that covers these members.

The plurality of guide shafts 202 extend in a direction parallel to an optical axis C, and are fixed to the stationary cylinder 201 at their two-end portions.

Figure 13:
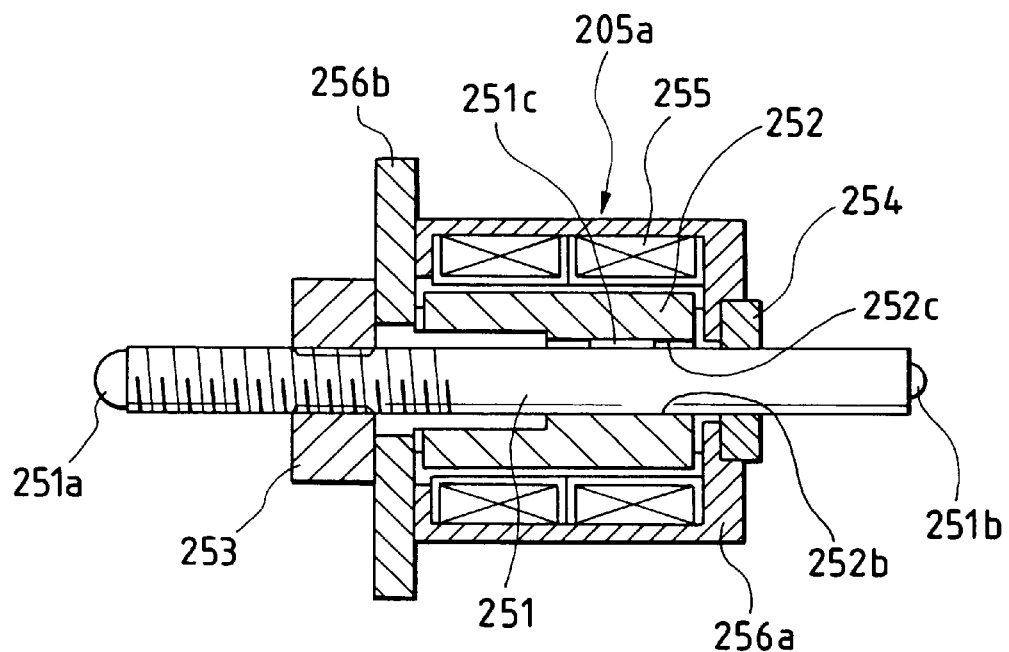
FIG. 13 is a sectional view of a motor used in the eighth embodiment.
Figure 14:
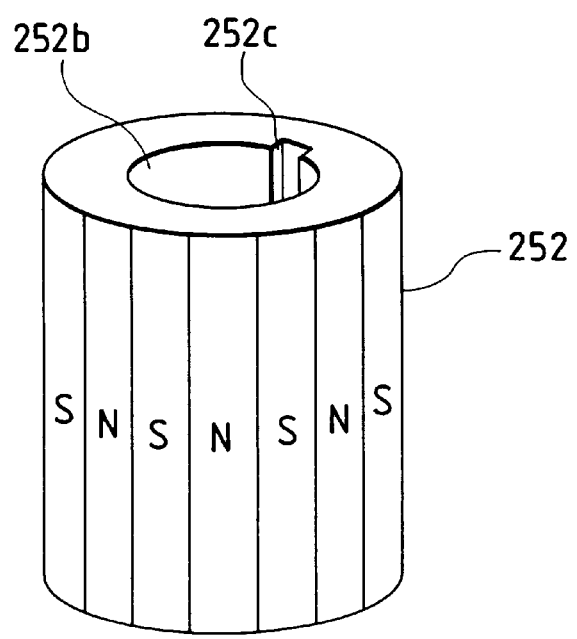
FIG. 14 is a perspective view of a rotor of the motor shown in FIG. 13.

As shown in FIG. 13, the stepping motor 205a has a rotor shaft 251 (actuation portion) which is formed with a male screw on its outer circumferential portion on one end portion side, a rotor 252 attached to the rotor shaft 251, a stator 255 arranged around the rotor 252, a hollow, cylindrical motor casing 256a that covers the rotor 252 and the stator 255, a flange 256b that closes an opening at one end portion of the hollow, cylindrical casing 256a, a bearing 254 for supporting the rotor shaft 251, and a nut member 253 formed with a female screw that threadably engages with the male screw of the rotor shaft 251. The two end portions (one end portion will be referred to as a first end portion 251a hereinafter, and the other end portion will be referred to as a second end portion 251b hereinafter) of the rotor shaft 251 project from the motor casing 256a. The two end portions 251a and 251b of the rotor shaft 251 have a spherical shape. A key 251c is formed on the middle portion of the rotor shaft 251. The key 251c projects radially outwardly, and extends in the extending direction of the rotor shaft 251. As shown in FIG. 14, the rotor 252 has a cylindrical shape, and N and S poles are alternately and regularly excited around the axis of the rotor 252. That is, this stepping motor 205a is of permanent magnet type (PM type). The rotor 252 has a through hole 252b that receives the rotor shaft 251. A key groove 252a is formed on the inner circumferential surface of the through hole 252b. The key groove 252a extends in the extending direction of the through hole 252b, and can receive the key 251c of the rotor shaft 251. With this structure, the rotor shaft 251 is attached to the rotor 252, so that the rotor shaft 251 does not rotate but moves in the extending direction of the rotor shaft 251 relative to the rotor 252 when the rotor shaft 251 is inserted into the through hole 252b of the rotor 252 and the key 251c of the rotor shaft 251 is fitted into the key groove 252a of the rotor 252. The stator 255 is fixed to the inner circumferential surface of the hollow, cylindrical casing 256a to face the outer circumferential surface of the rotor 252. The stator 255 is a two-phase coil, which is excited so that the rotor 252 rotates about the rotor shaft. The nut member 253 is fixed to the flange 256b fixed to one end portion of the casing 256a. The bearing 254 is fixed to the other end portion of the casing 256a. The bearing 254 supports the rotor shaft 251 to be rotatable and to be movable in the extending direction of the rotor shaft 251.

As shown in FIG. 12, the lens frame 203a is formed with a guide groove 231 which recesses radially inwardly, extends in the direction parallel to the optical axis C, and receives the guide shaft 202, a guide shaft insertion hole 232 which extends in the direction parallel to the optical axis C and receives the guide shaft 202, and first and second driving force acting portions 233a and 233b which project radially outwardly, and receive the driving force from the motor 205a. On the second driving force acting portion 233b side of the first driving force acting portion 233a, a first contact surface 234a is formed. The first contact surface 234a extends in a direction perpendicular to the optical axis C and contacts the first end portion 251a of the rotor shaft 251 is formed. Also, on the first driving force acting portion 233a side of the second driving force acting portion 233b, a second contact surface 234b is formed. The second contact surface 234b extends in the direction perpendicular to the optical axis C and contacts the second end portion 251b of the rotor shaft 251. The interval between the first and second contact surfaces 234a and 234b of the lens frame 203a is slightly smaller than the length of the rotor shaft 251 in a state wherein no rotor shaft 251 is arranged between the two surfaces 234a and 234b.

The motor 205a is fixed to the stationary cylinder 201 in a state wherein the rotor shaft 251 extends in a direction nearly parallel to the optical axis C, and is sandwiched between the first and second driving force acting portions 233a and 233b of the lens frame 203a.

The operation of the lens driving mechanism of this embodiment will be described below.

When currents are supplied to the stator 255 of the motor 205a, an electromagnetic force for rotating. the rotor 252 about the rotor shaft is generated, and the rotor 252 rotates. Since the rotor 252 is attached to the rotor shaft 251 so that it does not rotate relative to the rotor shaft 251, the rotor shaft 251 rotates upon rotation of the rotor 252. The rotor shaft 251 moves in the extending direction of the rotor shaft 251, i.e., in the direction parallel to the optical axis C, upon rotation of the rotor 252, since it threadably engages with the nut member 253 fixed to the flange 256b.

Since the two end portions 251a and 251b of the rotor shaft 251 respectively contact the contact surfaces 234a and 234b of the lens frame 203a, that are perpendicular to the optical axis C, the rotor shaft 251 moves in the direction perpendicular to the optical axis C relative to the lens frame 203a but does not move in the direction parallel to the optical axis C relative to the lens frame 203a. For this reason, when the rotor shaft 251 moves in the direction parallel to the optical axis C, the lens frame 203a and the lens 204 held by this lens frame 203a move in the optical axis direction while being guided by the guide shafts 202 upon movement of the rotor shaft 251.

As described above, according to this embodiment, since members corresponding to the feed screw 59 and the nut member 58 in the prior art shown in FIG. 28 are incorporated in the motor 205a, such feed screw 59 and nut member 58 need not be prepared additionally, and the number of parts can be reduced. In addition, since these members do not require high assembly precision, the number of assembly steps can be reduced.

Since the lens frame 203a is accurately guided by the guide shafts 202 to be movable in the direction parallel to the optical axis C, the lens frame 203a can accurately move in the optical axis direction as long as the driving force acts on the lens frame 203a in a direction including a component in a direction parallel to the optical axis C. For this reason, in this embodiment, the rotor shaft 251 for moving the lens frame 203a in the optical axis direction need only extend in a direction nearly parallel to the optical axis C. On the other hand, since the two end portions 251a and 251b of the rotor shaft 251 have spherical surfaces, the rotor shaft 251 is in point-contact with the contact surfaces 234a and 234b of the lens frame 203a, and the need for setting the rotor shaft 251 to be parallel to the optical axis C can be further obviated. Furthermore, as described above, relative to the lens frame 203a the rotor shaft 251 does not move in the direction parallel to the optical axis C but moves in the direction perpendicular to the optical axis C. Hence, production of any unwanted constraint force can be prevented unlike in the prior art without fixing the motor 205a to the stationary cylinder 201 with high positioning precision, and the number of assembly steps can be further reduced in addition to a decrease in the number of parts.

Figure 15:
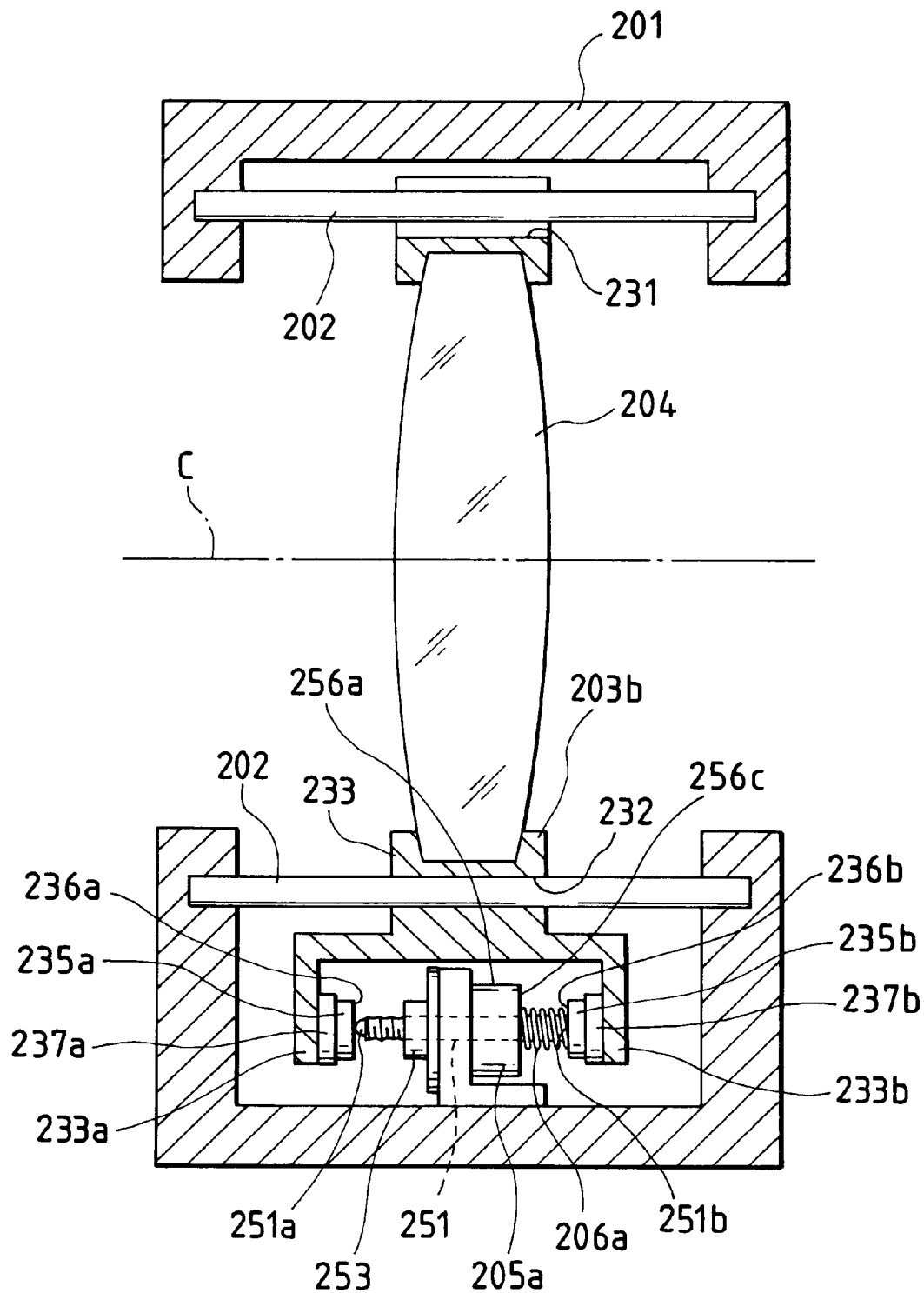
FIG. 15 is a sectional view of a lens driving mechanism according to the ninth embodiment of the present invention.

A lens driving mechanism according to the ninth embodiment of the present invention will be described below with reference to FIG. 15.

This embodiment is substantially the same as the eighth embodiment shown in FIG. 12, except that the contact portions between the rotor 251 and the lens frame 203a in the eighth embodiment are changed.

A lens frame 203b of this embodiment comprises a lens frame main body 233 which has first and second driving force acting portions 233a and 233b that project radially outwardly, and holds the lens 204, a first contact plate 235a having a first contact surface 236a that contacts the first end portion 251a of the rotor shaft 251, a second contact plate 235 having a second contact surface 236b that contacts the second end portion 251b of the rotor shaft 251, and first and second anti-vibration members 237a and 237b having elasticity. The lens frame main body 233 consists of a relatively light resin. The contact plates 235a and 235b consist of stainless steel having a smaller deformation amount against the load and higher wear resistance than the lens frame main body 233. The anti-vibration members 237a and 237b consist of rubber. The first anti-vibration member 237a is adhered to the surface of the first driving force acting portion 233a, that is on the second driving force acting portion 233b side, and the first contact plate 235a is adhered to this first anti-vibration member 237a. On the other hand, the second anti-vibration member 237b is adhered to the surface of the second driving force acting portion 233b, that is on the first driving force acting portion 233a side, and the second contact plate 235b is adhered to this second anti-vibration member 237b. The interval between the first and second contact surfaces 236a and 236b is slightly smaller than the length of the rotor shaft 251 while the rotor shaft 251 is arranged between the two surfaces 236a and 236b, as in the eighth embodiment shown in FIG. 12.

A coil spring 206a which has the rotor shaft 251 as the central axis is arranged between a surface 256c of the motor casing 256a, that is on the camera main body side (on the second end portion 251b side), and the second contact surface 236b.

In this embodiment, since the lens frame main body 233 consists of a resin, a weight reduction of the lens frame 203b can be attained. As a consequence, since the weight of the member to be moved by the motor 205a can be reduced, the load on the motors can also be reduced. Also, since the lens frame main body 233 consists of a resin having relatively high elasticity, the rotor shaft 251 can be easily fitted between the first and second driving force acting portions 233a and 233b of the lens frame main body 233, thus reducing the assembly labor. In addition, cluttering in the direction parallel to the optical axis C between the lens frame 203b and the rotor shaft 251 can be eliminated by elasticity of the lens frame 203b.

Also, in this embodiment, since the coil spring 206a biases the motor casing 256a and the nut member 253 fixed to that motor casing 256a toward the object side, the surface of the screw groove of the nut member 253, that faces the object side always contacts the surface of the thread of the male screw of the rotor shaft 251, that faces on the camera main body side, and cluttering between the male screw of the rotor shaft 251 and the female screw of the nut member 253 can be eliminated. For this reason, the positioning precision in the optical axis direction of the lens 204 can be improved. Note that the coil spring 206a is used for the purpose of eliminating cluttering between the male screw of the rotor shaft 251 and the female screw of the nut member 253. For this reason, unlike the coil spring 165 of the second embodiment shown in FIG. 6, which pushes the entire lens frame against the thrust of the motor 105a, the coil spring 206a need only have an elastic force smaller than that of the coil spring 165 of the second embodiment. Hence, the load on the motor 205a becomes slightly heavier than that in the eighth embodiment, but can be greatly smaller than that in the second embodiment.

Furthermore, in this embodiment, since the contact plates 235a and 235b that contact the two end portions 251a and 251b of the rotor shaft 251 consist of a stainless steel material having a smaller deformation amount against the load and higher wear resistance than the lens frame main body 233, the deformation amounts and wears of the contact surfaces 236a and 236b upon driving the motor can be reduced, and the positioning precision in the optical axis direction of the lens 204 can be further improved. Also, since the contact plates 235a and 235b are attached to the lens frame main body 233 via the rubber anti-vibration members 237a and 237b, vibrations transmitted from the motor 205a to the lens 204 can be suppressed to a minimum.

A lens driving mechanism according to the 10th embodiment of the present invention will be described below with reference to FIGS. 16 to 18.

Figure 16:
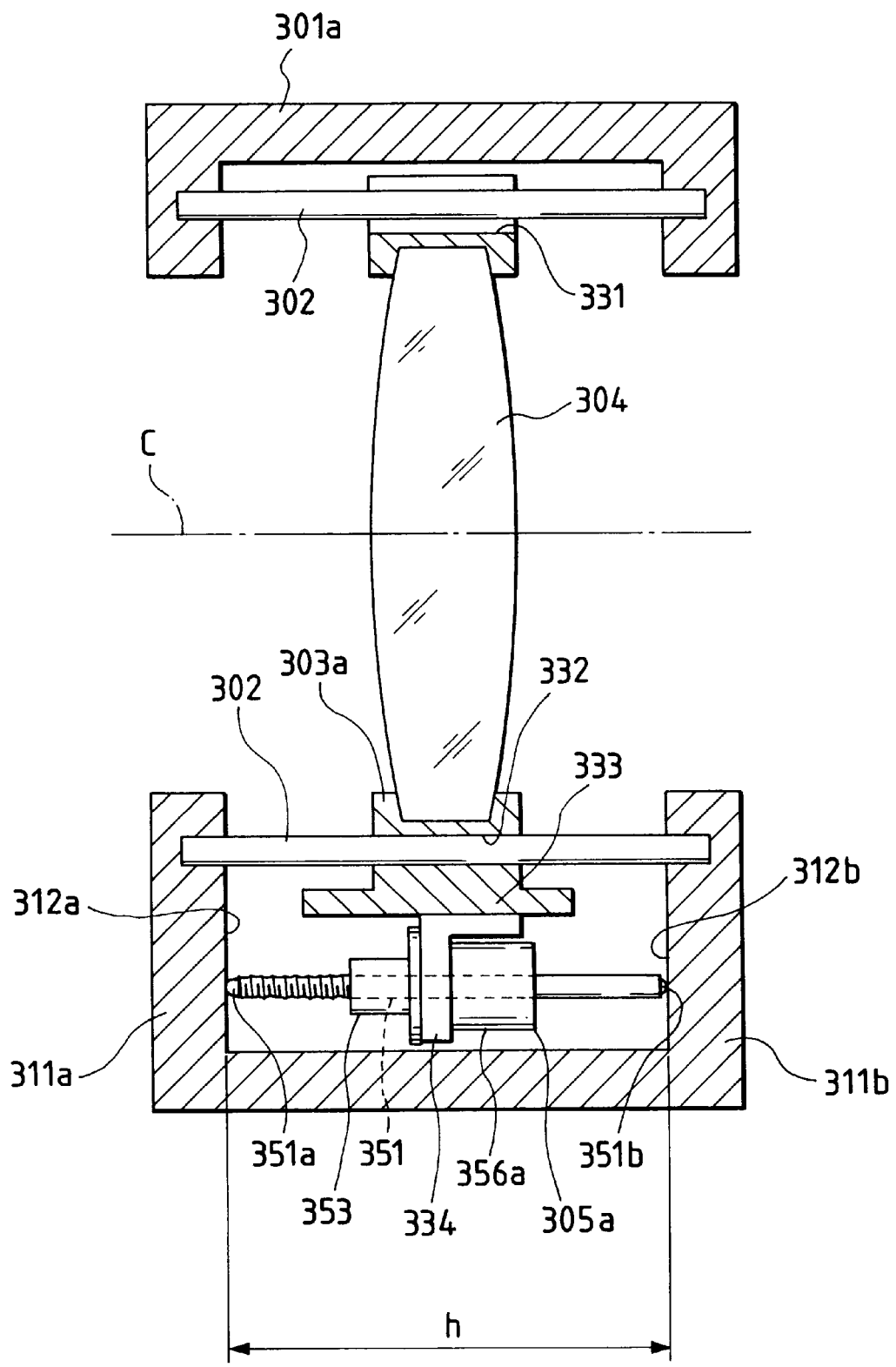
FIG. 16 is a sectional view of a lens driving mechanism according to the 10th embodiment of the present invention.

As shown in FIG. 16, the lens driving mechanism comprises a lens frame 303a for holding a lens 304, a plurality of guide shafts 302 for guiding the lens frame 303a to be movable in the optical axis direction of the lens 304, a stepping motor 305a for moving the lens frame 303a in the optical axis direction, and a substantially cylindrical stationary cylinder 301a that covers these members.

The plurality of guide shafts 302 extend in a direction parallel to an optical axis C, and are fixed to the stationary cylinder 301a at their two-end portions.

Figure 17:
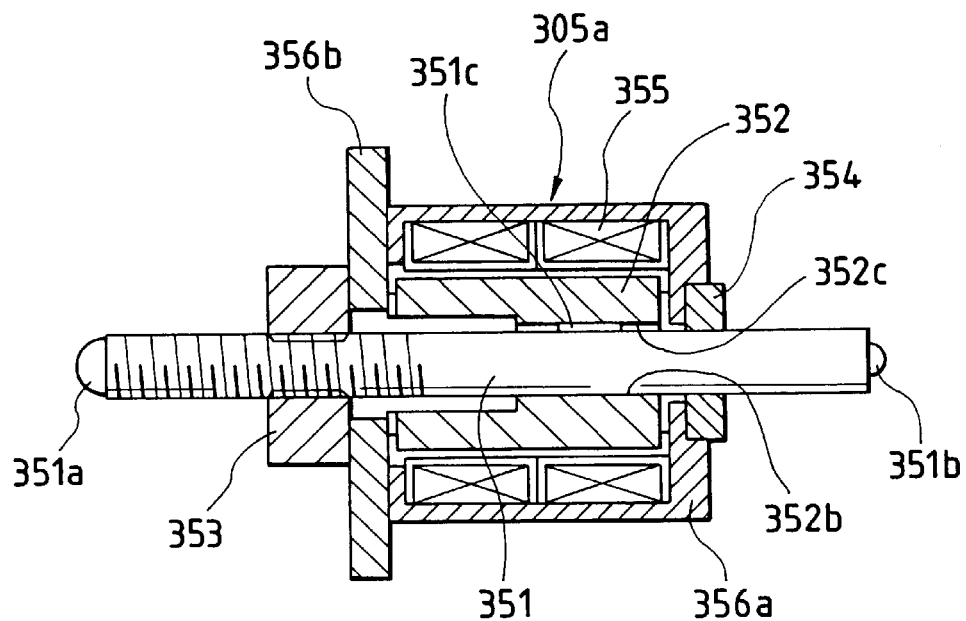
FIG. 17 is a sectional view of a motor used in the 10th embodiment.
Figure 18:
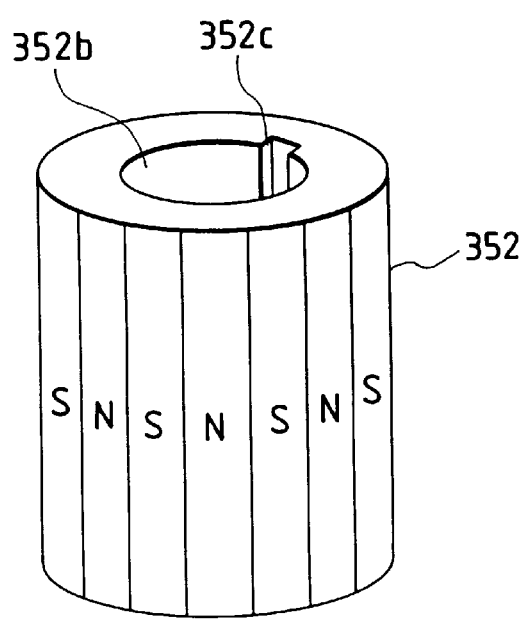
FIG. 18 is a perspective view of a rotor of the motor shown in FIG. 17.

As shown in FIG. 17, the stepping motor 305a has a rotor shaft 351 (actuation portion) which is formed with a male screw on its outer circumferential portion on one end portion side, a rotor 352 attached to the rotor shaft 351, a stator 355 arranged around the rotor 352, a hollow, cylindrical motor casing 356*a* that covers the rotor 352 and the stator 355, a flange 356*b* that closes an opening at one end portion of the hollow, cylindrical casing 356*a*, a bearing 354 for supporting the rotor shaft 351, and a nut member 353 formed with a female screw that threadably engages with the male screw of the rotor shaft 351. The two end portions (one end portion will be referred to as a first end portion 351*a* hereinafter, and the other end portion will be referred to as a second end portion 351*b* hereinafter) of the rotor shaft 351 project from the motor casing 356*a*. The two end portions 351*a* and 351*b* of the rotor shaft 351 have a spherical shape. A key 351*c* is formed on the middle portion of the rotor shaft 351. The key 351*c* projects radially outwardly, and extends in the extending direction of the rotor shaft 351. As shown in FIG. 18, the rotor 352 has a cylindrical shape, and N and S poles are alternately and regularly excited around the axis of the rotor 352. That is, this stepping motor 305*a* is of permanent magnet type (PM type). The rotor 352 has a through hole 352*b* that receives the rotor shaft 351. A key groove 352*a* is formed on the inner circumferential surface of the through hole 352*b*. The key groove 352*a* extends in the extending direction of the through hole 352*b*, and can receive the key 351*c* of the rotor shaft 351. With this structure, the rotor shaft 351 is attached to the rotor 352, so that the rotor shaft 351 does not rotate but moves in the extending direction of the rotor shaft 351 relative to the rotor 352 when the rotor shaft 351 is inserted into the through hole 352*b* of the rotor 352 and the key 351*c* of the rotor shaft 351 is fitted into the key groove 352*a* of the rotor 352. The stator 355 is fixed to the inner circumferential surface of the hollow, cylindrical casing 356*a* to face the outer circumferential surface of the rotor 352. The stator 355 is a two-phase coil, which is excited so that the rotor 352 rotates about the rotor shaft. The nut member 353 is fixed to the flange 356*b* fixed to one end portion of the casing 356*a*. The bearing 354 is fixed to the other end portion of the casing 356*a*. The bearing 354 supports the rotor shaft 351 to be rotatable and to be movable in the extending direction of the rotor shaft 351.

As shown in FIG. 16, the lens frame 303*a* is formed with a guide groove 331 which recesses radially inwardly, extends in the direction parallel to the optical axis C, and receives the guide shaft 302, a guide shaft insertion hole 332 which extends in the direction parallel to the optical axis C and receives the guide shaft 302, and a motor mount portion 333 to which the stepping motor 305*a* is attached.

The substantially cylindrical stationary cylinder 301*a* has flange portions 311*a* and 311*b* which are formed on the two end portions of the cylinder 301*a* in the optical axis direction, and project toward the optical axis C. Inner surfaces 312*a* and 312*b* of the two flange portions 311*a* and 311*b* are perpendicular to the optical axis C. The interval between the inner surfaces 312*a* and 312*b* of the two flange portions 311*a* and 311*b* is slightly smaller than a length h of the rotor shaft 351.

The motor casing 356*a* is fixed to the motor mount portion 333 of the lens frame 303*a* via a motor fixing frame 334, so that the rotor shaft 351 extends in a direction nearly parallel to the optical axis C, and is fitted between the two flange portions 351*a* and 311*b*, so that the two end portions 351*a* and 351*b* of the rotor shaft 351 respectively contact the inner surfaces (first and second contact surfaces) 312*a* and 312*b* of the two flange portions 311*a* and 311*b* of the stationary cylinder 301*a*. That is, in the stepping motor 305*a*, its motor casing 356*a* is fixed to the lens frame 303*a*, and its rotor shaft 351 contacts the stationary cylinder 301*a* to be relatively fixed in position in the direction parallel to the optical axis C.

The operation of the lens driving mechanism in this embodiment will be described below.

When currents are supplied to the stator 355 of the motor 305*a*, an electromagnetic force for rotating the rotor 352 about the rotor shaft is generated, and the rotor 352 rotates. Since the rotor 352 is attached to the rotor shaft 351 so that it does not rotate relative to the rotor shaft 351, the rotor shaft 351 rotates upon rotation of the rotor 352. The rotor shaft 351 moves relative to the motor casing 356*a* in the extending direction of the rotor shaft 351, i.e., in the direction parallel to the optical axis C upon rotation of the rotor 352, since it threadably engages with the nut member 353 fixed to the flange 356*b*.

Since the two end portions 351*a* and 351*b* of the rotor shaft 351 respectively contact the first and second contact surfaces 312*a* and 312*b* of the flange portions 311*a* and 311*b* of the stationary cylinder 301*a*, which surfaces are perpendicular to the optical axis C, the rotor shaft 351 moves in the direction perpendicular to the optical axis C but does not move in the direction parallel to the optical axis C relative to the stationary cylinder 301*a*. Since the rotor 351 cannot move in the direction parallel to the optical axis C relative to the stationary cylinder 301*a*, the motor casing 356*a*, instead, moves in the direction parallel to the optical axis C relative to the stationary cylinder 301*a*. As a consequence, upon movement of the motor casing 356*a*, the lens frame 303*a* and the lens 304 held by the lens frame 304*a* move in the optical axis direction while being guided by the guide shafts 302.

As described above, according to this embodiment, since members corresponding to the feed screw 59 and the nut member 58 in the prior art shown in FIG. 28 are incorporated in the motor 305*a*, such feed screw 59 and nut member 58 need not be prepared additionally, and the number of parts can be reduced. In addition, since these members do not require high assembly precision, the number of assembly steps can be reduced.

Since the lens frame 303*a* is accurately guided by the guide shafts 302 to be movable in the direction parallel to the optical axis C, the lens frame 303*a* can accurately move in the optical axis direction as long as the driving force acts on the lens frame 303*a* in a direction including a component in a direction parallel to the optical axis C. For this reason, in this embodiment, the rotor shaft 351 need only extend in a direction nearly parallel to the optical axis C. Since the two end portions 351*a* and 351*b* of the rotor shaft 351 have spherical surfaces, the rotor shaft 351 is in point-contact with the inner surfaces 312*a* and 312*b* of the stationary cylinder 301*a*, and the need for setting the rotor shaft 351 to be parallel to the optical axis C can be further obviated. Furthermore, as described above, relative to the stationary cylinder 301*a* the rotor shaft 351 does not move in the direction parallel to the optical axis C but moves in the direction perpendicular to the optical axis C. Hence, production of any unwanted constraint force can be prevented unlike in the prior art without fixing the motor 305*a* to the lens frame 303*a* with high positioning precision, and the number of assembly steps can be further reduced in addition to a decrease in the number of parts.

A lens driving mechanism according to the 11th embodiment of the present invention will be described below with reference to FIG. 19.

In this embodiment, the rotor shaft 351 in the 10th embodiment shown in FIG. 16 is modified to also have a function of the guide shafts 302, and other arrangements are the same as those in the 10th embodiment. Hence, the operation and effect of the lens driving mechanism of this embodiment are basically the same as those in the 10th embodiment.

A lens frame 303b is formed with a guide groove 331 which recesses radially inwardly, extends in the direction parallel to the optical axis C, and receives the guide shaft 302, and a motor mount portion 333 to which the stepping motor 305a is attached. The lens frame 303a in the 10th embodiment is formed with the guide shaft insertion hole 332 on the inner side of the motor mount portion 333. However, in this embodiment, since the rotor shaft 351 also serves as a guide shaft, no guide shaft insertion hole is formed at the inner side of the motor mount portion 333.

A stationary cylinder 301b is basically the same as the stationary cylinder 301a in the 10th embodiment, except that recess portions (first and second contact portions) 313a and 313b that receive the two end portions 351a and 351b of the rotor shaft 351 are formed on the inner surfaces 312a and 312b of the two flange portions 311a and 311b of the stationary cylinder 301b. The positions of the recess portions 313a and 313b in the inner surfaces 312a and 312b of the flange portions 311a and 311b of the stationary cylinder 301b are accurately determined, so that the rotor shaft 351 is accurately set to be parallel to the optical axis C when these recess portions receive the two end portions 351a and 351b of the rotor shaft 351.

The stepping motor 305a is fixed to the motor mount portion 333 of the lens frame 303b via the motor fixing frame 334 as in the 10th embodiment, so that the two end portions 351a and 351b of the rotor shaft 351 are fitted into the recess portions 313a and 313b of the two flange portions 311a and 311b of the stationary cylinder 301b. In this manner, since the two end portions 351a and 351b of the rotor shaft 351 are fitted into the recess portions 313a and 313b of the stationary cylinder 301b, the rotor shaft 351 can be accurately set to be parallel to the optical axis C. As a result, the rotor shaft 351 can serve as a guide shaft, and the number of guide shafts can be reduced. In addition, a size reduction of the lens frame 303b and the stationary cylinder 301b is attained.

In this embodiment, a decrease in the number of parts and a size reduction of the lens frame 303b and the stationary cylinder 301b can be realized as compared to the 10th embodiment shown in FIG. 16. However, since the rotor shaft 351 does not move relative to the stationary cylinder 301b in the direction perpendicular to the optical axis C, the motor 305a must be accurately attached to the lens frame 303b. Hence, this embodiment is inferior to the 10th embodiment in terms of a decrease in the number of assembly steps.

A lens driving mechanism according to the 12th embodiment of the present invention will be described below with reference to FIG. 20.

This embodiment is substantially the same as the 10th embodiment, except that the contact portions between the rotor shaft 351 and the stationary cylinder 301a in the 10th embodiment shown in FIG. 16 are changed.

A stationary cylinder 301c of this embodiment comprises a substantially cylindrical stationary cylinder main body that covers the lens 304, and the like, a first contact plate 315a having a first contact surface 316a that contacts the first end portion 351a of the rotor shaft 351, a second contact plate 315b having a second contact surface 316b that contacts the second end portion 351b of the rotor shaft 351, and first and second anti-vibration members 317a and 317b having elasticity.

The substantially cylindrical stationary cylinder main body 310 has flange portions 311a and 311b which project from the two end portions of the main body 310 in the optical axis direction toward the optical axis C. Inner surfaces 312a and 312b of the two flange portions 311a and 311b are perpendicular to the optical axis C. The stationary cylinder main body 310 consists of a relatively light resin. The contact plates 315a and 315b consist of a material (e.g., a stainless steel material) having a smaller deformation amount against the load and higher wear resistance than those of the stationary cylinder main body 310. The anti-vibration members 317a and 317b consist of, e.g., a rubber material. The anti-vibration members 317a and 317b are adhered onto the inner surfaces 312a and 312b of the stationary cylinder main body 310, and the contact plates 315a and 315b are adhered to the anti-vibration members 317a and 317b. The interval between the first and second contact surfaces 316a and 316b is slightly smaller than the length of the rotor shaft 351 as in the 10th embodiment shown in FIG. 16.

A coil spring 306a having the rotor shaft 351 as a central axis is arranged between a surface 356c of the motor casing 356a, that is on the camera main body side (the second end portion 351b side), and the second contact surface 315b.

In this embodiment, since the stationary cylinder main body 310 consists of a resin, a weight reduction of the stationary cylinder 301c can be attained. Since the stationary cylinder main body 310 is formed of a resin having relatively high elasticity, the rotor shaft 351 can be easily fitted between the first and second contact surfaces 316a and 316b of the stationary cylinder 301c, thus reducing the assembly labor. In addition, cluttering in the direction parallel to the optical axis C between the stationary cylinder 301c and the rotor shaft 351 can be eliminated by the elasticity of the stationary cylinder main body 310.

In this embodiment, since the coil spring 306a biases the motor casing 356a and the nut member 353 fixed to the motor casing 356a, the surface of the screw groove of the nut member 353 in the spring biasing direction and the surface of the thread of the rotor shaft 351 on the side opposing the spring biasing direction are always in contact with each other, and cluttering between the male screw of the rotor 351 and the female screw of the nut member 353 can be eliminated. For this reason, the positioning precision in the optical axis direction of the lens 304 can be improved. Note that the coil spring 306a is used for the purpose of eliminating cluttering between the male screw of the rotor shaft 351 and the female screw of the nut member 353. For this reason, unlike the coil spring 165 of the second embodiment shown in FIG. 6, which pushes the entire lens frame against the thrust of the motor 105a, the coil spring 306a need only have an elastic force smaller than that of the coil spring 165 of the second embodiment. Hence, the load on the motor 305a becomes slightly heavier than that in the 10th embodiment, but can be greatly smaller than that in the second embodiment.

Furthermore, in this embodiment, since the contact plates 315a and 315b that contact the two end portions 351a and 351b of the rotor shaft 351 consist of a material (e.g., a stainless steel material) having a smaller deformation amount against the load and higher wear resistance than those of the stationary cylinder main body 310, the deformation amounts and wears of the contact surfaces 316a and 316b upon driving the motor can be reduced, and the positioning precision in the optical axis direction of the lens 304 can be further improved. Since the contact plates 315a and 315b are attached to the stationary cylinder main body 310 via the anti-vibration members (e.g., rubber members) 317a and 317b, noise produced by vibrations of the stepping motor 305a can be reduced.

Figure 21:
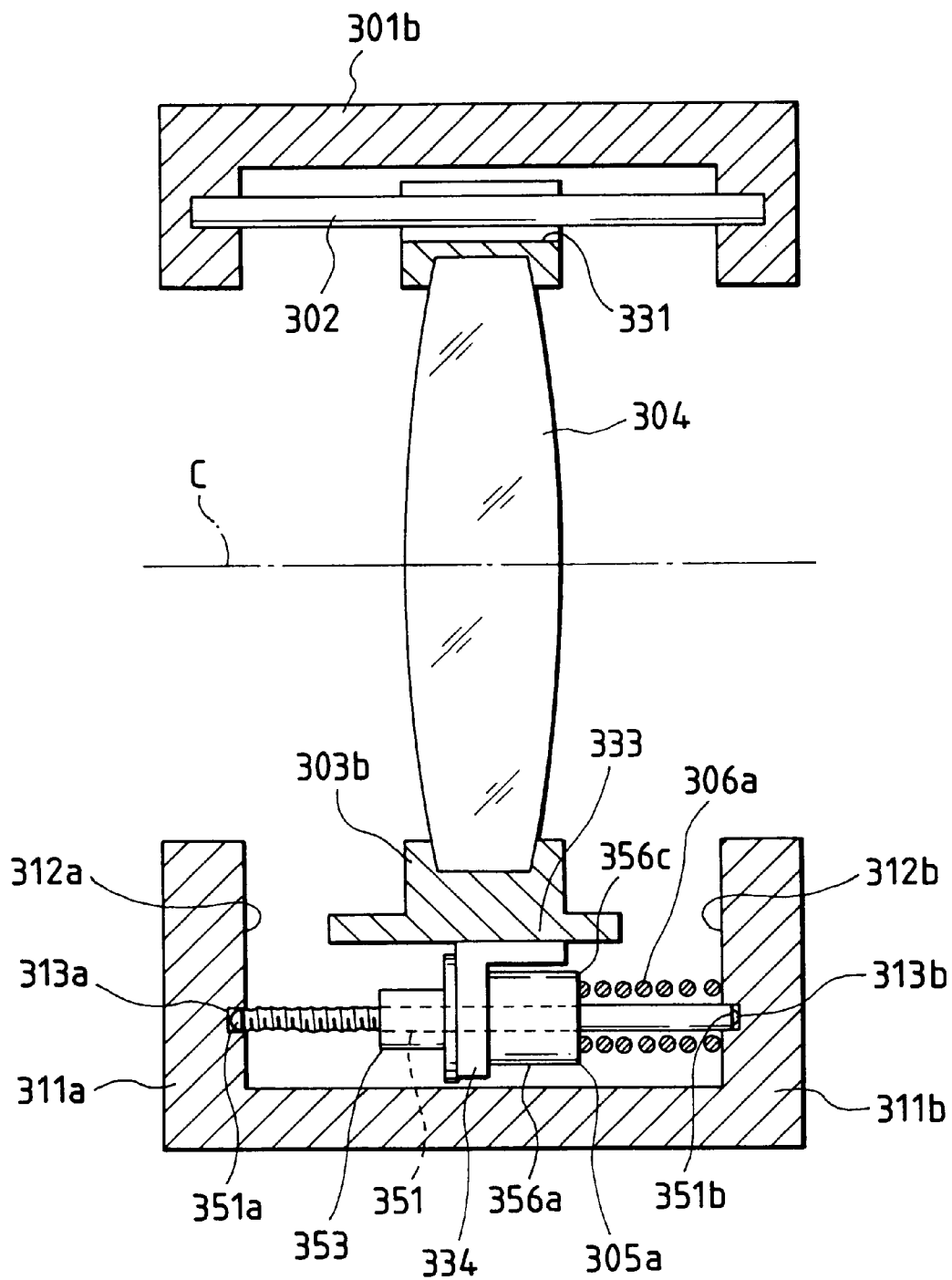
FIG. 21 is a sectional view of a lens driving mechanism according to the 13th embodiment of the present invention.

A lens driving mechanism according to the 13th embodiment of the present invention will be described below with reference to FIG. 21.

Figure 19:
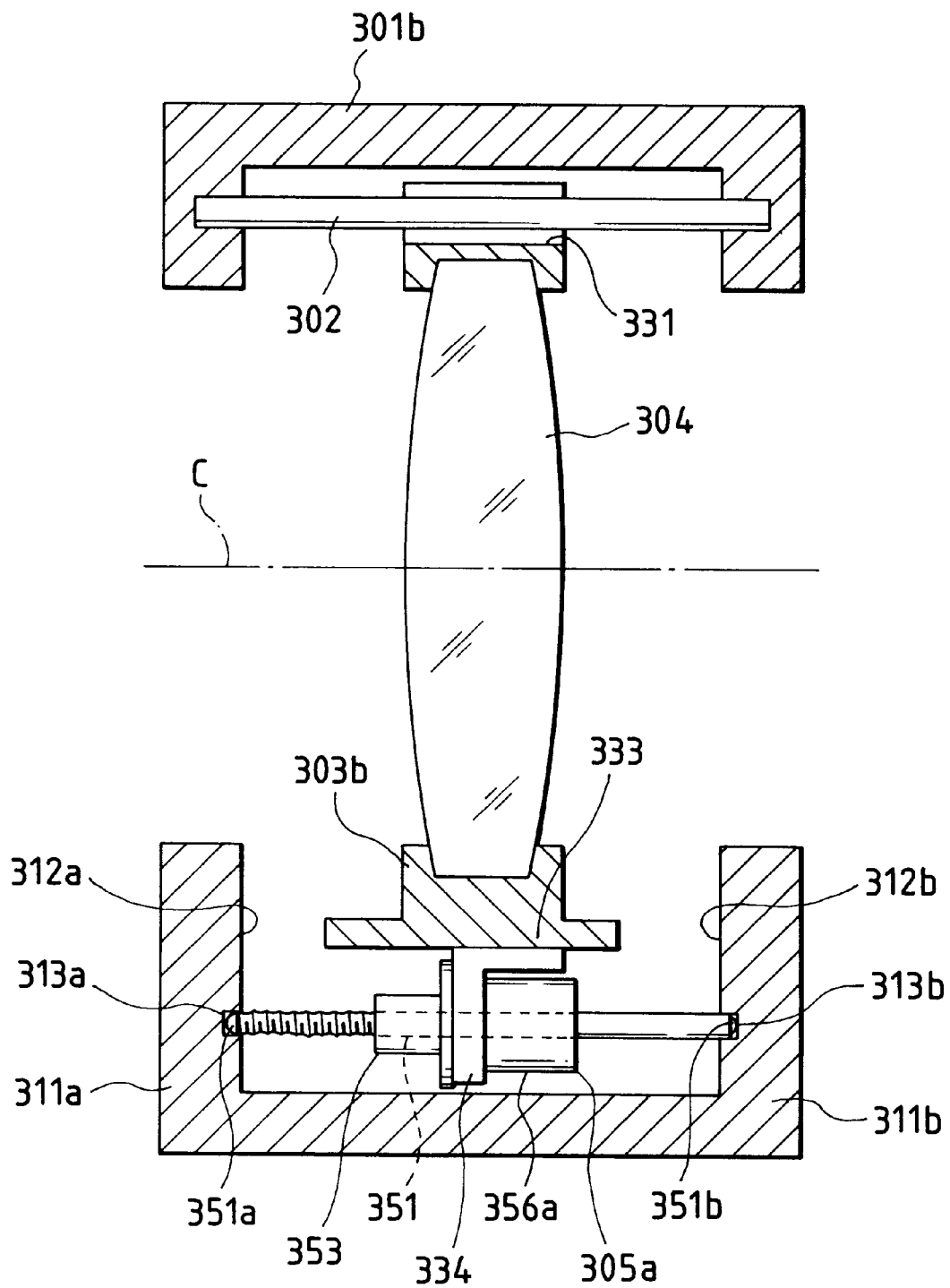
FIG. 19 is a sectional view of a lens driving mechanism according to the 11th embodiment of the present invention.

In this embodiment, a coil spring 306a having the rotor shaft 351 as a central axis is arranged between a surface 356c of the motor casing 356a, that is on the camera main body side (the second end portion 351b side), and the inner surface 312b of the flange portion 311b in the 11th embodiment shown in FIG. 19, and other arrangements are the same as those in the 11th embodiment.

Figure 20:
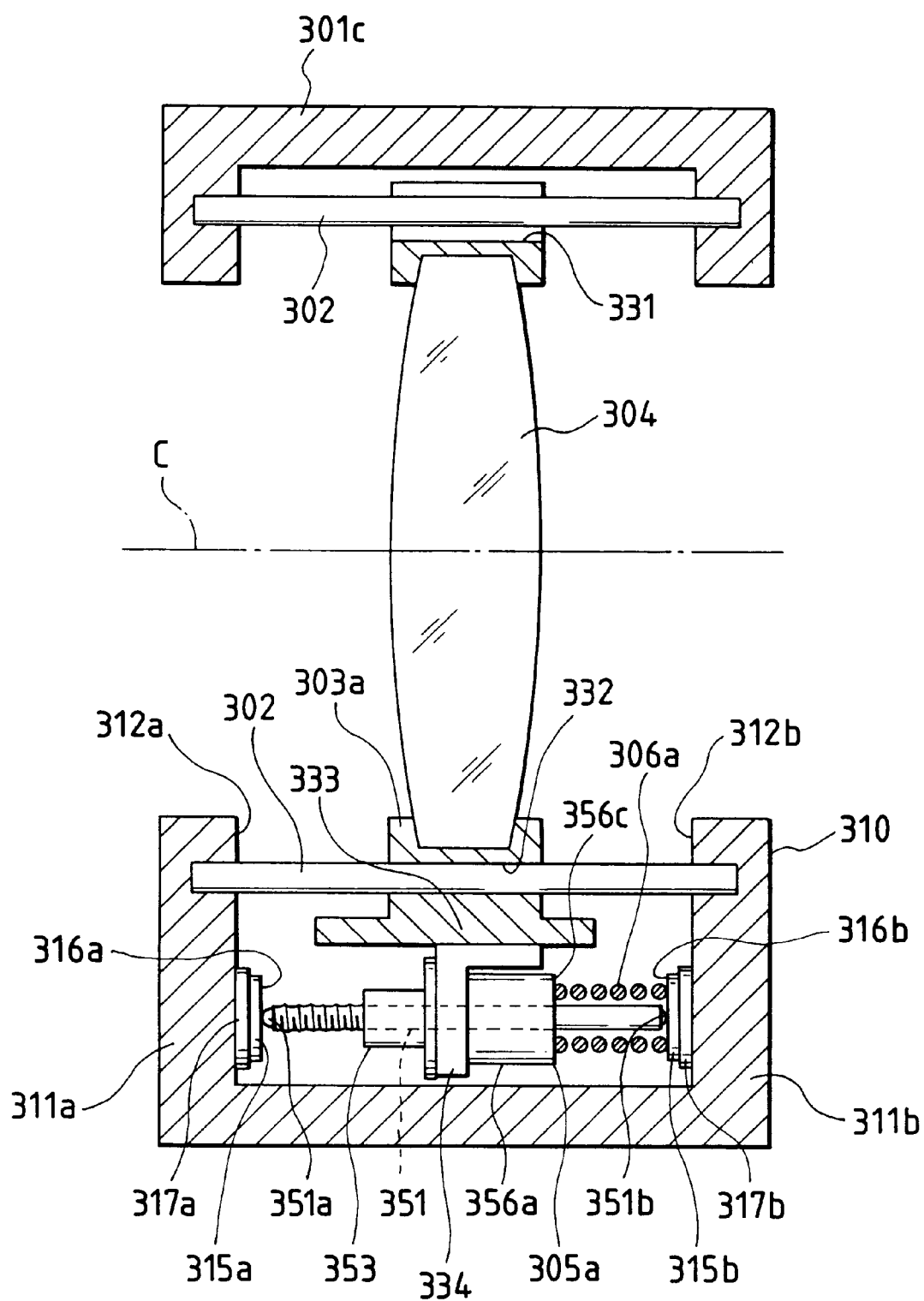
FIG. 20 is a sectional view of a lens driving mechanism according to the 12th embodiment of the present invention.

Hence, in this embodiment, cluttering between the male screw of the rotor shaft 351 and the female screw of the nut member 353 can be eliminated by the coil spring 306a as in the 12th embodiment shown in FIG. 20.

In each of the 10th to 13th embodiments, the stationary cylinder is prepared by integrally forming a cylinder portion and flange portions. Alternatively, in order to allow adjustment of the interval between the two flanges, one flange may be attached to the cylinder portion so that its position in the optical axis direction can be adjusted.

A lens driving mechanism according to the 14th embodiment of the present invention will be described below with reference to FIGS. 22 to 24.

Figure 22:
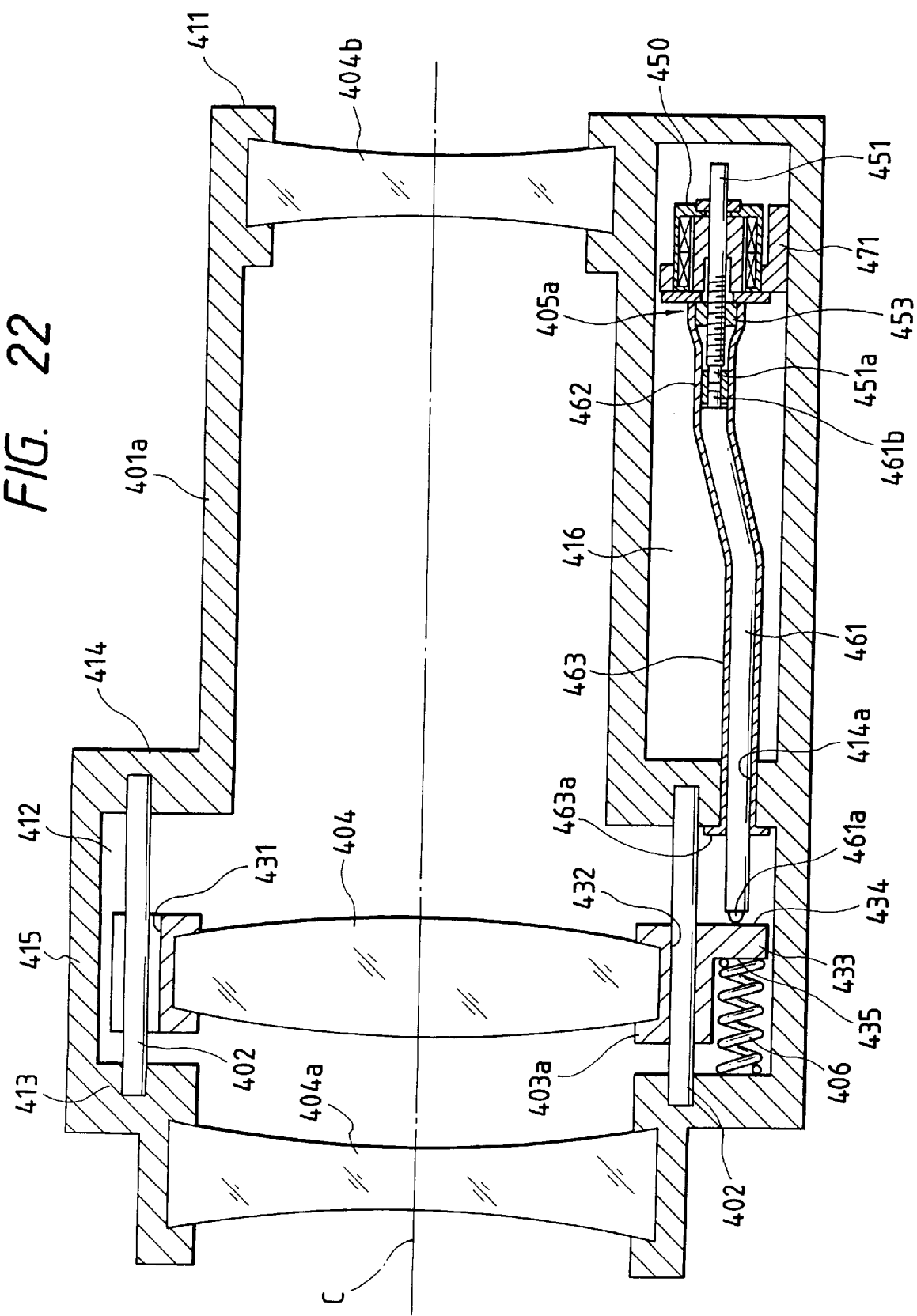
FIG. 22 is a sectional view of a lens driving mechanism according to the 14th embodiment of the present invention.

As shown in FIG. 22, the lens driving mechanism comprises a lens frame 403a for holding a lens 404, a plurality of guide shafts 402 for guiding the lens frame 403a to be movable in the optical axis direction of the lens 404, a motor 405a for moving the lens frame 403a in the optical axis direction, and a stationary cylinder 401a that covers these members.

The lens includes a first lens 404a, second lens 404, and third lens 404b in turn from the object side to the camera main body side. The first and third lenses 404a and 404b are fixed to the stationary cylinder 401a via lens frames (not shown). A moving space 412 for the second lens frame 403a to be moved in the optical axis direction is assured in the middle portion of the stationary cylinder 401a. This lens frame moving space 412 is defined by first and second walls 413 and 414, which are perpendicular to the optical axis C and project in a direction to separate from the optical axis C, and a circumferential wall 415 that connects the outer edges of the first and second walls 413 and 414. A motor storage chamber 416 that stores the motor 405a is formed on the circumferential wall 415 on the camera main body side. A mount portion 411 to be connected to the camera main body is formed on the stationary cylinder 401a on the camera main body side.

The plurality of guide shafts 402 extend in a direction parallel to the optical axis C, and are fixed to the first and second walls 414 of the stationary cylinder 401a at their two-end portions. The lens frame 403a has a guide groove 431 which recesses radially inwardly and receives the guide shaft 402, a guide shaft insertion hole 432 for receiving the guide shaft 402, and a driving force acting portion 433 which projects radially outwardly, and receives a driving force from the motor 405a. This driving force acting portion 433 has a wire contact surface 434 which is formed on its camera main body side and is perpendicular to the optical axis C, and a spring contact surface 435 which is formed on its object side and is perpendicular to the optical axis C. A coil spring (biasing means) 406 for biasing the lens frame 403a toward the camera main body side is arranged between the spring contact surface 435 of the driving force acting portion 433, and the first wall 413 of the stationary cylinder 401a.

The motor 405a comprises a motor main body 450 having a rotor shaft (actuation portion) 451 which projects/retreats while rotating, a flexible wire (wire member) 461, a coupling member 462 for coupling the wire 461 and the rotor shaft 451, and a guide tube 463 which covers the wire 461 and the coupling member 462 to define the moving path of the wire 461, as shown in FIG. 23.

The motor main body 450 has the above-mentioned rotor shaft 451 having a male screw formed on the outer circumferential surface on one end portion side, a rotor 452 attached to the rotor shaft 451, a stator 455 arranged around the rotor 452, a hollow, cylindrical casing 456a that covers the rotor 452 and the stator 455, a flange 456b that closes an opening on one end portion side of the hollow, cylindrical casing 456a, a bearing 454 for supporting the rotor shaft 451, and a nut member 453 formed with a female screw that threadably engages with the male screw of the rotor shaft 451. A coupling projection 451a which is fitted into the coupling member 462 is formed on one end portion of the rotor shaft 451. A key 451c is formed on the central portion of the rotor shaft 451. The key 451c projects radially outwardly, and extends in the extending direction of the rotor shaft 451. As shown in FIG. 24, the rotor 452 has a cylindrical shape, and N and S poles are alternately and regularly excited around the axis of the rotor 452. That is, this motormain body 450 builds a permanent magnet type (PM type) stepping motor. The rotor 452 has a through hole 452b that receives the rotor shaft 451. A key groove 452c is formed on the inner circumferential surface of the through hole 452b. The key groove 452c extends in the extending direction of the through hole 452b, and can receive the key 451c of the rotor shaft 451. With this structure, the rotor shaft 451 is attached to the rotor 452, so that the rotor shaft 451 does not rotate but moves in the extending direction of the rotor shaft 451 relative to the rotor 452 when the rotor shaft 451 is inserted into the through hole 452b of the rotor 452 and the key 451c of the rotor shaft 451 is fitted into the key groove 452c of the rotor 452. The stator 455 is fixed to the inner circumferential surface of the hollow, cylindrical casing 456a to face the outer circumferential surface of the rotor 452. The stator 455 is a two-phase coil, which is excited so that the rotor 452 rotates about the rotor shaft. The nut member 453 is fixed to the flange 456b fixed to one end portion of the casing 456a. The bearing 454 is fixed to the other end portion of the casing 456a. The bearing 454 supports the rotor shaft 451 to be rotatable and to be movable in the extending direction of the rotor shaft 451.

The wire 461 used has a very small elastic deformation amount although it is flexible. That is, this wire 461 is bent when, for example, a load acts on the end portion of the wire 461 in the longitudinal direction of the wire, but the elastic deformation amount in the longitudinal direction is substantially zero. A semi-spherical contact end portion 461a is formed on one end portion of the wire 461, and a coupling projection 461b on which the coupling member 462 is fitted is formed on the other end portion of the wire 461. The coupling member 462 has a hollow, cylindrical shape, which receives the coupling projection 451a formed on one end portion of the rotor shaft 451, and the coupling projection 461b formed on the other end portion of the wire 461, thereby coupling the rotor shaft 451 and the wire 461. As a result, when the rotor shaft 451 rotates, the wire 461 also rotates, and when the rotor 451 moves in its longitudinal direction, the wire 461 also moves in its longitudinal direction. The wire 461, the coupling member 462, one end portion of the rotor shaft 451, and the nut member 453 are covered by the guide tube 463. The guide tube 463 is formed of an elastic resin. For this reason, even when the wire 461 is inserted through the guide tube 463, it can be bent together with the guide tube 463. The inner diameter of the guide tube 463 is substantially equal to or slightly larger than the outer diameter of the wire 461. For this reason, the wire 461 does not flex relative to the guide tube 463, and the moving amount of one end portion 461a of the wire 461 in its longitudinal direction can be substantially equal to that of the rotor shaft 451. A lubricant is applied between the inner circumferential surface of the guide tub 463 and the outer circumferential surface of the wire 461. A flange 463a is formed on one end portion of the guide tube 463 to fix there at the stationary cylinder 401a.

The motor main body 450 is fixed on the camera main body side in the motor storage chamber 416 of the stationary cylinder 401a by a motor attachment member 471. A guide tube insertion hole 414a extends through the second wall 414 of the stationary cylinder 401a in the direction parallel to the optical axis C. One end portion 463a of the guide tube 463 of the motor 405a is fixed to the second wall 414 via the guide tube through hole 414a that extends in the direction parallel to the optical axis C. With this arrangement, one end portion 461a of the wire 461 projects from one end portion 463a of the guide tube 463 in the direction parallel to the optical axis. The one end portion 461a of the wire 461 contacts the wire contact surface 434 of the lens frame 403a. As described above, since the lens frame 403a is biased by the coil spring 406 toward the camera main body side, the wire contact surface 434 of the lens frame 403a always contacts the one end portion 461a of the wire 461 independently of the moving direction of the lens frame 403a in the optical axis direction. In other words, the lens frame 403a and one end portion 461a of the wire 461 are coupled to each other while their relative movement is inhibited in the direction parallel to the optical axis C.

The operation of the lens driving mechanism in this embodiment will be explained below.

When currents are supplied to the stator 455 of the motor main body 450, an electromagnetic force for rotating the rotor 452 about the rotor shaft is generated, and the rotor 452 rotates. Since the rotor 452 is attached to the rotor shaft 451 so that it does not rotate relative to the shaft 451, the rotor shaft 451 rotates upon rotation of the rotor 452. The rotor shaft 451 moves in the extending direction of the rotor shaft 451 upon rotation of the rotor shaft 451 since it threadably engages with the nut member 453 fixed to the flange 456b. Since the other end portion 461b of the wire 461 is coupled to one end portion 451a of the rotor shaft 451 via the coupling member 462, the wire 461 moves in its longitudinal direction while rotating upon rotation and movement of the rotor shaft 451. Since one end portion of the wire 461 is guided by the guide tube 463 to become parallel to the optical axis C, it moves in the direction parallel to the optical axis C while rotating, upon rotation and movement of the rotor shaft 451.

Since the wire contact surface 434 of the lens frame 403a, that is perpendicular to the optical axis C, and the one end portion 461a of the wire 461 always contact each other, as described above, the lens frame 403a also moves in the direction parallel to the optical axis C while being guided by the guide shafts 402, upon movement of the one end portion 461a of the wire 461 in the direction parallel to the optical axis C.

As described above, in this embodiment, since members corresponding to the feed screw 59 and the nut member 58 in the prior art shown in FIG. 28 are incorporated in the motor 405a, such feed screw 59 and nut member 58 need not be prepared additionally, and the number of parts can be reduced. In addition, since these members do not require high assembly precision, the number of assembly steps can be reduced.

Since the lens frame 403a is accurately guided by the guide shafts 402 to be movable in the direction parallel to the optical axis C, the lens frame 403a can accurately move in the optical axis direction as long as the driving force acts on the lens frame 403a in a direction including a component in a direction parallel to the optical axis C. For this reason, in this embodiment, one end portion of the wire 461 that moves the lens frame 403a in the optical axis direction need only be guided by the guide tube 463 in a direction nearly parallel to the optical axis C. Furthermore, since the one end portion 461a of the wire 461 has a spherical surface, it is in point-contact with the wire contact surface 434 of the lens frame 403a and, hence, the need for setting one end portion of the wire 461 to be parallel to the optical axis C can be further obviated. Also, the position of the one end portion 461a of the wire 461 in the direction perpendicular to the optical axis C can be freely determined as long as it falls within the range in which it contacts with the wire contact surface 434 of the lens frame 403a. Furthermore, the position of the motor main body 450 can be freely determined within the range in which the wire 461 can be bent. Hence, the lens frame 403a can be accurately moved in the optical axis direction without fixing the motor 405a to the stationary cylinder 401a with very high positioning precision.

Since the lens frame 403a does not move in the direction parallel to the optical axis C but moves in the direction perpendicular to the optical axis C relative to the one end portion 461a of the wire 461, production of any unwanted constraint force can be prevented unlike in the prior art without fixing the motor 405a to the stationary cylinder 401a with very high positioning precision. In this embodiment, the one end portion 461a of the wire 461 may whirl upon rotation. Even when the one end portion 461a of the wire 461 whirls upon rotation, no unwanted constraint force is produced since the one end portion 461a of the wire 461 moves in the direction perpendicular to the optical axis C relative to the lens frame 403a, and has a spherical surface.

As described above, in this embodiment, since the motor 405a does not require high attachment precision, the number of assembly steps can be further reduced in addition to the above-mentioned decrease in the number of parts.

In this embodiment, when the length, bending amount, and the like of the wire 461 are adjusted, the position of the motor main body 450 can be freely determined and, hence, it has no limitations in design. For this reason, a certain distance can be assured between the lens frame 403a and the motor main body 450, and heat, vibrations, and the like can be prevented from being transmitted from the motor main body 450 to the lens frame 403a. When the motor main body 450 is set on the camera main body side, the weight on the object side of the lens barrel is reduced, and the moment having the camera main body as a basic point can be decreased, and a load required for holding the camera can be reduced.

Figure 25:
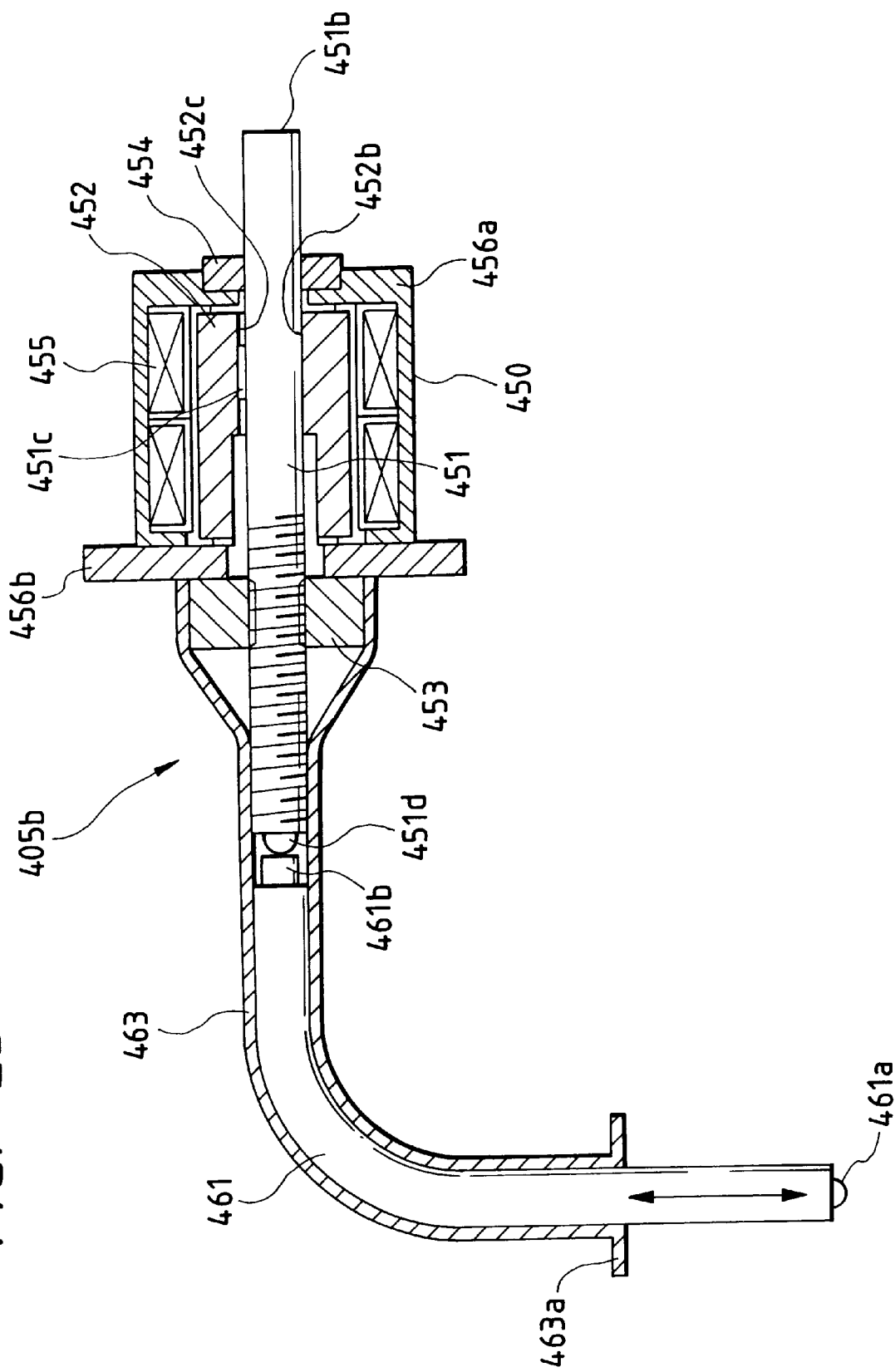
FIG. 25 is a sectional view of a motor used in a lens driving mechanism according to the 15th embodiment of the present invention.

A lens driving mechanism according to the 15th embodiment of the present invention will-be described below with reference to FIG. 25.

In the lens driving mechanism according to this embodiment, the way of coupling the rotor shaft 451 of a motor 405b and the wire 461 is different from that in the 14th embodiment shown in FIG. 22, and other arrangements are the same as those in the 14th embodiment.

A semi-spherical wire contact portion 451d is formed on one end portion of the rotor shaft 451 of this embodiment. Between the rotor shaft 451 and the wire 461, the wire contact portion 451d of the rotor shaft 451 simply contacts the coupling projection 461b of the wire 461. As shown in FIG. 22, since the coil spring 406, which biases the lens frame 403a in a direction to contact the one end portion 461a of the wire 461, biases the other end portion (coupling projection) 461b of the wire 461 in a direction to contact the one end portion (wire contact portion) 451d of the rotor shaft 451, the other end portion 461b of the wire 461 always contacts the one end portion 451d of the rotor shaft 451 independently of the moving direction of the rotor shaft 451. In other words, the other end portion 461b of the wire 461 and the one end portion 451d of the rotor shaft 451 are coupled so that they do not move relative to each other in their longitudinal direction.

Hence, as in the 14th embodiment shown in FIG. 22, upon movement of the rotor shaft 451, the wire 461 moves and can move the lens frame 403a. Since the other end portion 461b of the wire 461 simply contacts the one end portion 451d of the rotor shaft 451, the wire 461 moves without rotating upon rotation as a result of movement of the rotor shaft 451. Also, since the other end portion 461b of the wire 461, that is a flat surface contacts the one end portion 451d of the rotor shaft 451, that is a spherical surface, they can be bent at this contact surface.

Figure 26:
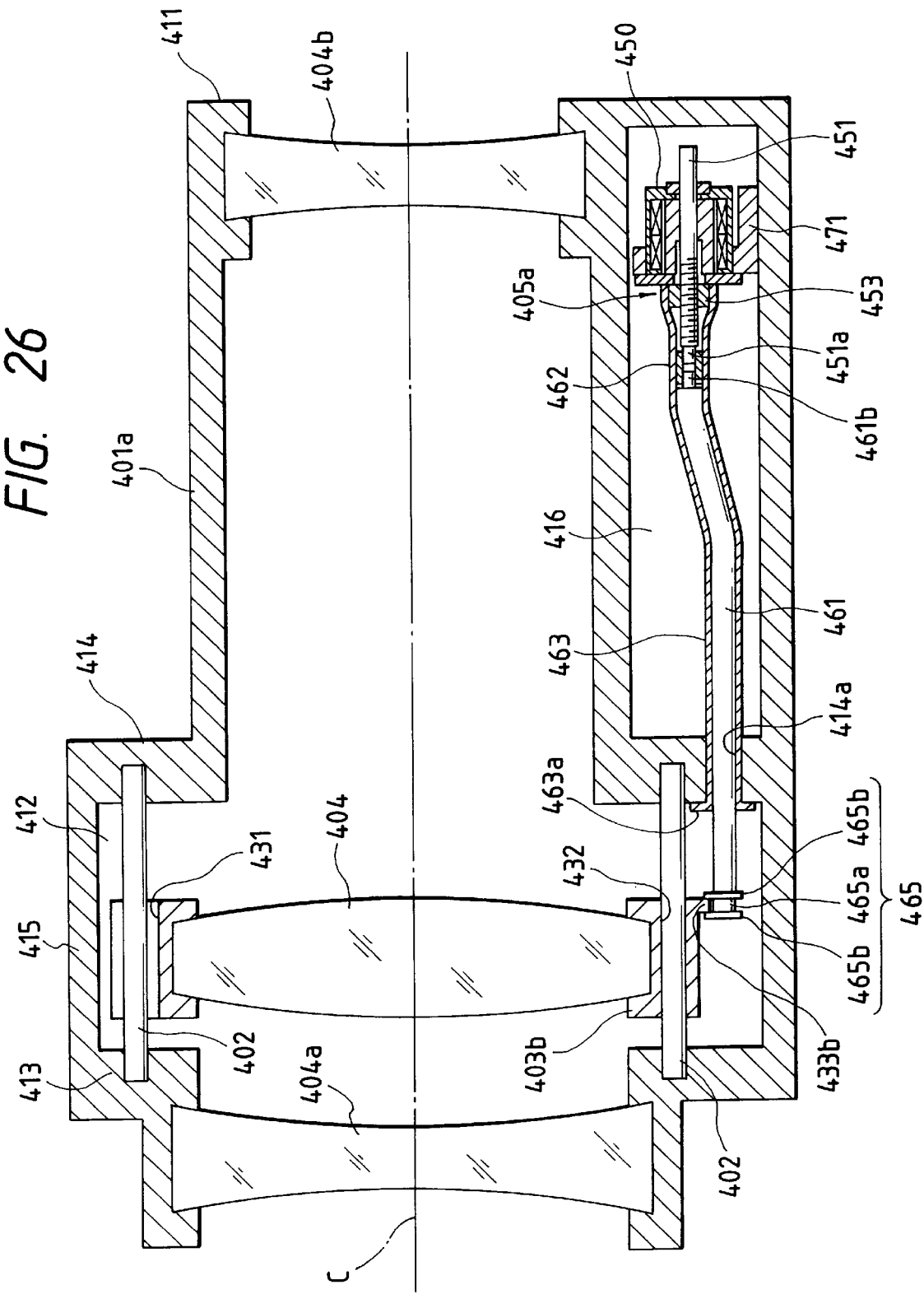
FIG. 26 is a sectional view of a lens driving mechanism according to the 16th embodiment of the present invention.

A lens driving mechanism according to the 16th embodiment of the present invention will be described below with reference to FIG. 26.

In the lens driving mechanism according to this embodiment, the way of coupling one end portion of the wire 461 to a lens frame 403b is different from that in the 14th embodiment shown in FIG. 22, and other arrangements are the same as those in the 14th embodiment.

The lens frame 403b of this embodiment has a driving force acting portion 433b which projects radially outwardly, and receives a driving force from the motor 405a. An engaging member 465 that engages with the driving force acting portion 433b is fixed to one end portion of the wire 461. The engaging member 465 has a cylindrical middle body portion 465a, and disc-shaped flange portions 465b fixed to the two end portions of the body portion 465a. The interval between the two opposing flange portions 465b, i.e., the length of the middle body portion 465a, is nearly equal to the length of the driving force acting portion 433b in the direction parallel to the optical axis C. The driving force acting portion 433b of the lens frame 403b is fitted between the two flange portions 465b of the engaging member 465.

Hence, since the one end portion of the wire 461 and the lens frame 403b do not relatively move in the direction parallel to the optical axis, the lens frame 403b moves in the optical axis direction upon movement of the wire 461, as in the 14th embodiment shown in FIG. 22. Also, since one end portion of the wire 461 and the lens frame 403b relatively move in the direction perpendicular to the optical axis C, no unwanted constraint force is produced unlike in the prior art, as in the 14th embodiment.

In this embodiment, since one end portion of the wire 461 and the lens frame 403b are coupled by the engaging member 465 so that they do not relatively move in the direction parallel to the optical axis C, the need for the coil spring 406 used in the 14th embodiment can be obviated. In this embodiment, since the coil spring can be omitted, the load on the motor can be reduced as compared to the 14th embodiment, and a size reduction of the motor can be attained.

Figure 27:
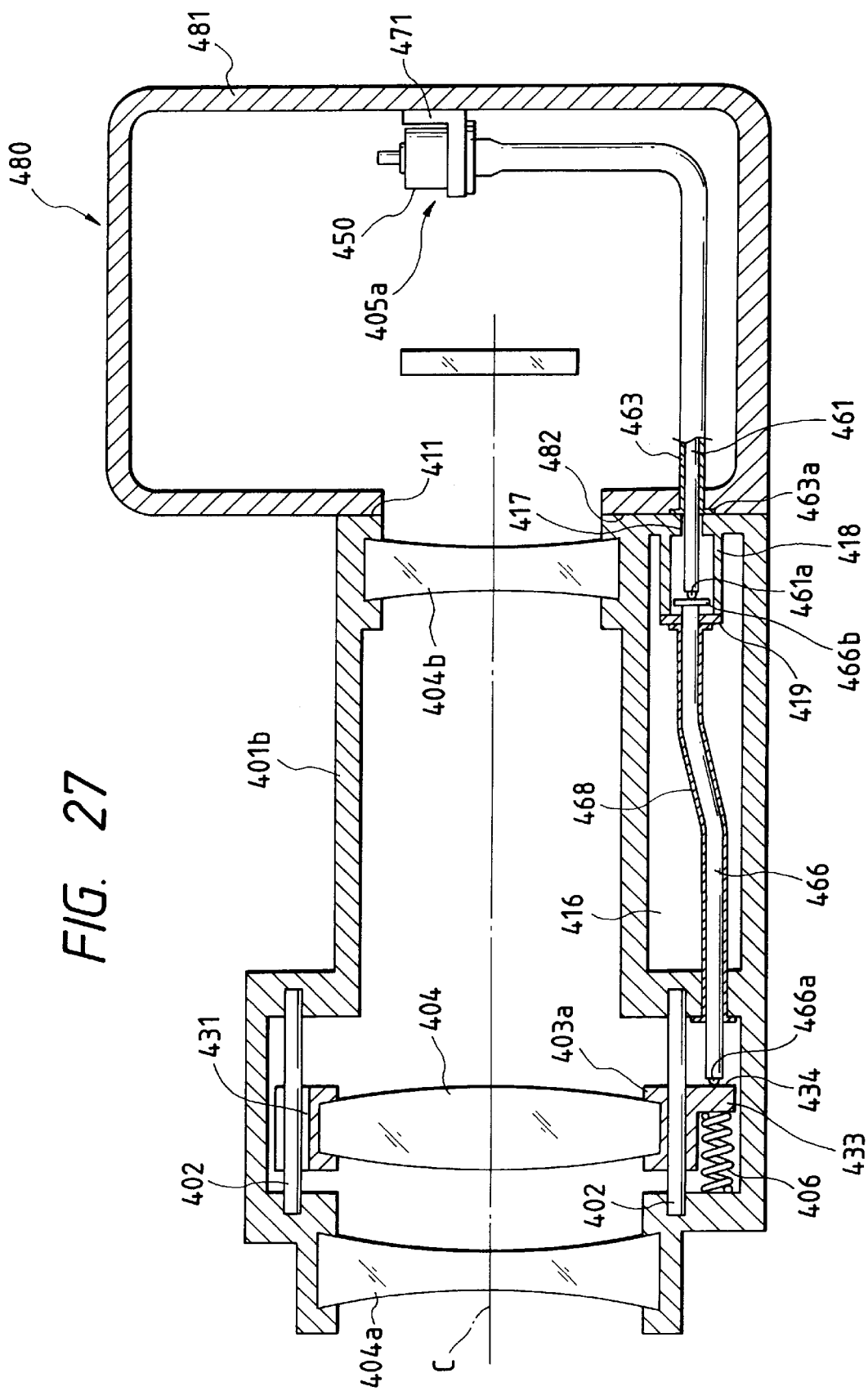
FIG. 27 is a sectional view of a lens driving mechanism according to the 17th embodiment of the present invention.

A lens driving mechanism according to the 17th embodiment of the present invention will be described below with reference to FIG. 27.

In this embodiment, a motor main body for driving a lens is arranged in the camera main body side of a camera which uses an exchangeable lens.

The motor 405a in the 14th embodiment shown in FIG. 22 is arranged in a camera main body casing 481. The motor main body 450 is fixed to the inner wall of the camera main body casing 481 by the motor attachment member 471. The wire 461 coupled to the rotor shaft of the motor 405a and the guide tube 463 that covers the wire 461 extend from the motor main body 450 toward a mount portion 482 of a camera main body 480. The flange 463a formed on one end portion of the guide tube 463 is fixed to the mount portion 482 of the camera main body 480. The one end portion 461a of the wire 461 projects from the mount portion 482 toward the object side upon driving the motor main body 450.

The wire insertion hole 417 is formed in the mount portion 411 of the stationary cylinder 401b, so that the one end portion 461a of the wire 461 on the camera main body side can enter a stationary cylinder 401b. A wire 466 on the lens barrel side and a guide tube 468 on the lens barrel side which guides the position of the wire 466 are arranged in the stationary cylinder 401b. One end portion 466a of the wire 466 on the lens barrel side contacts the wire contact surface 434 of the lens frame 403a, and the other end portion 466b thereof contacts the one end portion 461a of the wire 461 on the camera main body side. A semi-spherical contact portion 466a is formed on one end portion of the wire 466 on the lens barrel side, which contacts the lens frame 403a, as in the 14th embodiment shown in FIG. 22. On the other end portion of the wire 466 on the lens barrel side, a disc-shaped wire contact seat 466b that contacts the one end portion 461a of the wire 461 on the camera main body side is formed. The stationary cylinder 401b has a guide frame 418 for guiding the moving direction of the wire contact seat 466b of the wire 466 on the lens barrel side, and a movement limitation plate 419 for limiting the moving amount of the wire contact seat 466b toward the object side.

The coil spring 406 that biases the lens frame 403a also biases the wire 466 on the lens barrel side toward the camera main body side via the lens frame 403a. For this reason, when the lens barrel is connected to the camera main body 480 and the wire 461 on the camera main body side enters the stationary cylinder 401b, the coil spring 406 also serves as a member for biasing the other end portion 466b of the wire 466 on the lens barrel side in a direction to contact the one end portion 461a of the wire 461 on the camera main body side, and the other end portion 466b of the wire 466 on the lens barrel side always contacts the one end portion 461a of the wire 461 on the camera main body side. Hence, when the motor main body 450 in the camera main body casing 481 is driven to move the wire 461 on the camera main body side, the wire 466 on the lens barrel side moves upon movement of the wire 461, and the lens frame 403a moves in the optical axis direction. Since the other end portion 466b of the wire 466 on the lens barrel side simply contacts the one end portion 461a of the wire 461 on the camera main body side, the wire 466 on the lens barrel side moves without rotating upon rotation as a result of movement of the wire 461 on the camera main body side.

Note that this embodiment uses the coil spring 406 that couples the wire 466 on the lens barrel side and the lens frame 403 so that they do not relatively move in the direction parallel to the optical axis. In place of this coil spring, the engaging member 465 described in the 16th embodiment shown in FIG. 26 may be used. In this case, however, in order to assure contact between the wire 466 on the lens barrel side and the wire 461 on the camera main body side, a coil spring or the like should be arranged between the wire contact seat 466b of the wire 466 on the lens barrel side and the movement limitation plate 419 of the stationary cylinder 401b.

The motor used in each of the above embodiments is a permanent magnet type stepping motor. However, the present invention is not limited to such specific stepping motor. For example, a variable reactance (VR) or hybrid type stepping motor may be used. Also, the present invention is not limited to the stepping motor, but may be applied to, e.g., a DC motor or ultrasonic wave motor as long as a female screw can be formed on the rotor shaft and a nut member that threadably engages with the male screw can be arranged. Furthermore, a hydraulic cylinder whose output shaft moves in its axial direction, a linear electromagnetic motor, the actuation portion of which moves rectilinearly, or the like may be used.

Therefore, it is intended that the invention not be limited to the preferred embodiments described herein, but that the invention will include all embodiments falling within the scope of the appended claims.

What is claimed is:

1. A lens driving mechanism for moving a lens in an optical axis direction thereof, comprising:

a lens frame to hold said lens;

a guide to guide said lens frame to be movable in the optical axis direction of said lens; and an actuator having an actuation portion that moves in a direction nearly parallel to an optical axis of said lens, wherein said lens frame and said actuation portion are directly or indirectly connected so that said lens frame does not move in the optical axis direction relative to said actuation portion of said actuator.

2. A mechanism according to claim 1, wherein said actuator comprises:

a rotor shaft extending in the direction nearly parallel to the optical axis, having a male screw formed on a portion of an outer circumferential surface thereof, and serving as said actuation portion;

a rotor attached to said rotor shaft, said rotor being not rotatable but movable in the optical axis direction relative to said rotor shaft;

a stator arranged around said rotor and rotating said rotor;

an actuator casing to cover said rotor and said stator; and a nut member fixed to said actuator casing and formed with a female screw that meshes with the male screw of said rotor shaft.

3. A mechanism according to claim 2, further comprising:

a coupling portion which engages with said lens frame, said coupling portion being not movable in the optical axis direction relative to said lens frame, and is attached to said rotor shaft, said coupling portion being not movable in the optical axis direction relative to said rotor shaft.

4. A mechanism according to claim 2, wherein said lens frame is formed with a contact surface that contacts an end portion of said rotor shaft, and said lens driving mechanism further comprises a biasing device to bias said lens frame in the optical axis direction and in a direction in which said contact surface of said lens frame and the end portion of said rotor shaft come into contact with each other.

5. A mechanism according to claim 4, wherein said lens frame has a contact plate which forms said contact surface, and a lens frame main body which holds said lens and to which said contact plate is attached, and said contact plate comprises a material having a higher wear resistance than said lens frame main body.

6. A mechanism according to claim 5, wherein said lens frame has an anti-vibration member having elasticity, and said contact plate is attached to said lens frame main body via said anti-vibration member.

7. A mechanism according to claim 4, wherein the end portion of said rotor shaft, which contacts said contact surface of said lens frame, has a spherical surface.

8. A mechanism according to claim 7, wherein said lens frame has a contact plate which forms said contact surface, and a lens frame main body which holds said lens and to which said contact plate is attached, and said contact plate comprises a material having a higher wear resistance than said lens frame main body.

9. A mechanism according to claim 8, wherein said lens frame has an anti-vibration member having elasticity, and said contact plate is attached to said lens frame main body via said anti-vibration member.

10. A mechanism according to claim 4, wherein said biasing device comprises a spring.

11. A mechanism according to claim 2, further comprising:

a guide shaft extending in a direction parallel to the optical axis, and attached to said lens frame, said guide shaft being not movable in the optical axis direction relative to said lens frame; and a coupling portion engaged with said guide shaft, said coupling portion being not movable in the optical axis direction relative to said guide shaft, and attached to said rotor shaft, said coupling portion being not movable in the optical axis direction relative to said rotor shaft.

12. A mechanism according to claim 2, further comprising:

a guide shaft extending in a direction parallel to the optical axis, formed with a contact surface that contacts an end portion of said rotor shaft, and attached to said lens frame, said guide shaft being not movable in the optical axis direction relative to said lens frame; and a biasing device to bias said lens frame or said guide shaft in the optical axis direction and in a direction in which said contact surface of said guide shaft and the end portion of said rotor shaft come into contact with each other.

13. A mechanism according to claim 12, wherein said biasing device comprises a spring.

14. A lens driving mechanism for moving a lens in an optical axis direction thereof, comprising:

a lens frame to hold said lens;

a guide device to guide said lens frame to be movable in the optical axis direction of said lens; and an actuator having an actuator casing and an actuation portion which moves in a direction nearly parallel to an optical axis of said lens, wherein two end portions of said actuation portion of said actuator in the optical axis direction project from said actuator casing, and said lens frame is formed with a first contact portion that contacts one of the end portions of said actuation portion, and a second contact portion that contacts the other of the end portions of said actuation portion.

15. A mechanism according to claim 14, wherein said actuator comprises:

a rotor shaft extending in the direction nearly parallel to the optical axis, having a male screw formed on a portion of an outer circumferential surface thereof, and serving as said actuation portion;

a rotor attached to said rotor shaft, said rotor being not rotatable but movable in the optical axis direction relative to said rotor shaft;

a stator arranged around said rotor and rotates said rotor; and a nut member fixed to said actuator casing and is formed with a female screw that meshes with the male screw of said rotor shaft, wherein said rotor and said stator are covered by said actuator casing.

16. A mechanism according to claim 15, wherein an elastic member to generate an elastic force in the optical axis direction is arranged between said first contact portion of said lens frame and said actuator casing, or between said second contact portion of said lens frame and said actuator casing.

17. A mechanism according to claim 16, wherein said elastic member comprises a spring.

18. A mechanism according to claim 15, wherein the two end portions of said actuation portion have a spherical shape.

19. A mechanism according to claim 15, wherein said lens frame has a first contact plate that forms said first contact portion, a second contact plate that forms said second contact portion, and a lens frame main body which holds said lens and to which said first and second contact plates are attached, and said first and second contact plates comprise a material having a higher wear resistance than said lens frame main body.

20. A mechanism according to claim 19, wherein said lens frame has first and second anti-vibration members having elasticity, and said first and second contact plates are respectively attached to said lens frame main body via said first and second anti-vibration members.

21. A mechanism according to claim 14, wherein the two end portions of said actuation portion have a spherical shape.

22. A mechanism according to claim 14, wherein said lens frame has a first contact plate that forms said first contact portion, a second contact plate that forms said second contact portion, and a lens frame main body to hold said lens and to which said first and second contact plates are attached, and said first and second contact plates comprise a material having a higher wear resistance than said lens frame main body.

23. A mechanism according to claim 22, wherein said lens frame has first and second anti-vibration members having elasticity, and said first and second contact plates are respectively attached to said lens frame main body via said first and second anti-vibration members.

24. A lens driving mechanism for moving a lens in an optical axis direction thereof in a lens barrel, comprising:

a lens frame to hold said lens;

a guide to guide said lens frame to be movable in the optical axis direction of said lens; and an actuator having an actuator casing and an actuation portion which moves relative to said actuator casing in a direction nearly parallel to an optical axis of said lens, wherein two end portions of said actuation portion of said actuator in the optical axis direction project from said actuator casing, said actuator casing is fixed to said lens frame; and said lens barrel is formed with first and second contact portions which respectively contact the two end portions of said actuator, said actuation portion being not movable in the optical axis direction relative to said lens barrel.

25. A mechanism according to claim 24, wherein said actuator comprises:

a rotor shaft extending in the direction nearly parallel to the optical axis, having a male screw formed on a portion of an outer circumferential surface thereof, and serving as said actuation portion;

a rotor attached to said rotor shaft, said rotor being not rotatable but movable in the optical axis direction relative to said rotor shaft;

a stator arranged around said rotor and rotates said rotor; and a nut member fixed to said actuator casing and formed with a female screw that meshes with the male screw of said rotor shaft, wherein said rotor and said stator are covered by said actuator casing.

26. A mechanism according to claim 25, wherein an elastic member to generate an elastic force in the optical axis direction is arranged between said first contact portion of said lens barrel and said actuator casing, or between said second contact portion of said lens barrel and said actuator casing.

27. A mechanism according to claim 26, wherein the two end portions of said actuation portion have a spherical shape.

28. A mechanism according to claim 26, wherein said lens barrel has a first contact plate that forms said first contact portion, a second contact plate that forms said second contact portion, and a lens barrel main body to which said first and second contact plates are attached, and said first and second contact plates comprise a material having a higher wear resistance than said lens barrel main body.

29. A mechanism according to claim 28, wherein said lens barrel has first and second anti-vibration members having elasticity, and said first and second contact plates are respectively attached to said lens barrel main body via said first and second anti-vibration members.

30. A mechanism according to claim 26, wherein said elastic member comprises a spring.

31. A mechanism according to claim 24, wherein the two end portions of said actuation portion have a spherical shape.

32. A mechanism according to claim 24, wherein said lens barrel has a first contact plate that forms said first contact portion, a second contact plate that forms said second contact portion, and a lens barrel main body to which said first and second contact plates are attached, and said first and second contact plates comprise a material having a higher wear resistance than said lens barrel main body.

33. A mechanism according to claim 32, wherein said lens barrel has first and second anti-vibration members having elasticity, and said first and second contact plates are respectively attached to said lens barrel main body via said first and second anti-vibration members.

34. A lens driving mechanism for moving a lens in an optical axis direction thereof, comprising:

a lens frame to hold said lens;

a guide to guide said lens frame to be movable in the optical axis direction of said lens; and an actuator to move said lens in the optical axis direction together with said lens frame, said actuator having:

an actuator main body having an actuation portion which reciprocally moves in a predetermined direction; a wire member having flexibility, and one end portion of which contacts said lens frame or is directly or indirectly coupled to said lens frame, said wire member being not movable in the optical axis direction relative to said lens frame, and the other end portion of which contacts said actuation portion of said actuator main body or is directly or indirectly coupled to said actuation portion, said wire member being not movable in the predetermined direction relative to said actuation portion; and a guide member to movably guide said wire member.

35. A mechanism according to claim 34, wherein said actuator main body comprises:

a rotor shaft extending in the predetermined direction, having a male screw formed on a portion of an outer circumferential surface thereof, and serving as said actuation portion;

a rotor attached to said rotor shaft, said rotor being not rotatable about said rotor shaft but movable in an extending direction of said rotor shaft relative to said rotor shaft;

a stator arranged around said rotor and rotating said rotor;

an actuator casing that covers said rotor and said stator; and a nut member fixed to said actuator casing and formed with a female screw that meshes with the male screw of said rotor shaft.

36. A mechanism according to claim 35, further comprising:

a biasing device to bias said lens frame to always contact the one end portion of said wire member.

37. A mechanism according to claim 36, wherein said biasing device comprises a spring.

38. A mechanism according to claim 35, wherein said guide member is a pipe-shaped member which has flexibility and is formed with an insertion hole that can receive said wire member.

39. A mechanism according to claim 34, further comprising:

a biasing device to bias said lens frame to always contact the one end portion of said wire member.

40. A mechanism according to claim 34, wherein said guide member is a pipe-shaped member having flexibility and is formed with an insertion hole that can receive said wire member.

41. An actuator, an actuation end of which projects/retreats, comprising:

a rotor shaft extending in a predetermined direction and having a male screw formed on a portion of an outer circumferential surface thereof;

a rotor attached to said rotor shaft, said rotor being not rotatable about said rotor shaft but movable in an extending direction of said rotor shaft relative to said rotor shaft;

a stator arranged around said rotor and rotates said rotor;

an actuator casing that covers said rotor and said stator;

a nut member fixed to said actuator casing and formed with a female screw that meshes with the male screw of said rotor shaft;

a wire member having flexibility, and one end portion of which is coupled to an end portion of said rotor, said wire member being not movable in the predetermined direction and not rotatable relative to said rotor shaft, and the other end portion of which serves as the actuation end; and a guide member to movably guide said wire member.

* * * * *